United States Patent
Kim et al.

(10) Patent No.: US 10,189,427 B2
(45) Date of Patent: Jan. 29, 2019

(54) VEHICLE AND METHOD OF CONTROLLING A DISPLAY THEREIN

(71) Applicant: LG ELECTRONICS INC., Seoul (KR)

(72) Inventors: Hangtae Kim, Seoul (KR); Kyungdong Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/873,727

(22) Filed: Jan. 17, 2018

(65) Prior Publication Data
US 2018/0201207 A1 Jul. 19, 2018

(30) Foreign Application Priority Data
Jan. 17, 2017 (KR) .................. 10-2017-0008183

(51) Int. Cl.
| | |
|---|---|
| B60Q 1/00 | (2006.01) |
| B60Q 1/50 | (2006.01) |
| B60Q 1/40 | (2006.01) |
| G08G 1/123 | (2006.01) |
| G08B 25/00 | (2006.01) |
| G08B 3/00 | (2006.01) |
| G08B 5/00 | (2006.01) |
| G05B 11/01 | (2006.01) |
| G08C 19/16 | (2006.01) |
| G06F 3/038 | (2013.01) |

(Continued)

(52) U.S. Cl.
CPC .......... B60R 16/0236 (2013.01); B60K 37/06 (2013.01); B60Q 9/008 (2013.01); B60R 1/006 (2013.01); B60W 40/09 (2013.01); B60W 50/14 (2013.01); G06N 99/005 (2013.01)

(58) Field of Classification Search
None
See application file for complete search history.

(56) References Cited

U.S. PATENT DOCUMENTS

| | | | |
|---|---|---|---|
| 6,752,444 B2* | 6/2004 | Kitano | B60R 7/04 296/184.1 |
| 7,663,502 B2* | 2/2010 | Breed | B60C 11/24 340/12.25 |

(Continued)

FOREIGN PATENT DOCUMENTS

| | | |
|---|---|---|
| JP | 2012113605 | 6/2012 |
| KR | 1020140065963 | 5/2014 |
| KR | 1020150051671 | 5/2015 |

OTHER PUBLICATIONS

PCT International Application No. PCT/KR2018/000544, Notification of Transmittal of the International Search Report and the Written Opinion of the International Searching Authority, or Declaration dated Apr. 9, 2018, 13 pages.

*Primary Examiner* — Steven Lim
*Assistant Examiner* — Muhammad Adnan
(74) *Attorney, Agent, or Firm* — Lee, Hong, Degerman, Kang & Waimey

(57) ABSTRACT

Disclosed are a vehicle and method of controlling a display therein. Herein, the vehicle supports auto driving. The present invention includes sensors, a display including a display area formed on a glass of the vehicle and a controller configured to cause the display to display data obtained via at least one of the sensors on the display area based on an operation mode of the vehicle and vehicle passenger information.

12 Claims, 34 Drawing Sheets

(51) Int. Cl.
  *B60R 16/023*   (2006.01)
  *B60W 40/09*    (2012.01)
  *B60W 50/14*    (2012.01)
  *B60K 37/06*    (2006.01)
  *B60Q 9/00*     (2006.01)
  *B60R 1/00*     (2006.01)
  *G06N 99/00*    (2010.01)

(56) References Cited

U.S. PATENT DOCUMENTS

| | | | | |
|---|---|---|---|---|
| 8,106,755 B1* | 1/2012 | Knox | ............... | B60Q 9/008 340/435 |
| 9,958,870 B1* | 5/2018 | Graybill | ............... | G05D 1/0268 |
| 2006/0290782 A1* | 12/2006 | Chen | ............... | B60R 1/00 348/148 |
| 2009/0115631 A1* | 5/2009 | Foote | ............... | B60Q 1/2665 340/901 |
| 2010/0292886 A1* | 11/2010 | Szczerba | ............... | G01C 21/365 701/31.4 |
| 2012/0277947 A1* | 11/2012 | Boehringer | ............... | B60W 30/17 701/23 |
| 2013/0076787 A1* | 3/2013 | Mathieu | ............... | B60R 1/00 345/633 |
| 2014/0240464 A1* | 8/2014 | Lee | ............... | G01S 17/08 348/47 |
| 2015/0145995 A1* | 5/2015 | Shahraray | ............... | H04W 4/70 348/148 |
| 2015/0168720 A1* | 6/2015 | Oh | ............... | B60R 1/00 345/690 |
| 2016/0198126 A1* | 7/2016 | Matsumoto | ............... | H04N 7/181 348/118 |
| 2016/0311323 A1* | 10/2016 | Lee | ............... | B60K 37/06 |
| 2016/0355133 A1* | 12/2016 | Kim | ............... | G02B 27/01 |
| 2017/0004641 A1* | 1/2017 | Ota | ............... | B60K 35/00 |
| 2017/0043664 A1* | 2/2017 | Rajendran | ............... | B60K 35/00 |
| 2017/0124406 A1* | 5/2017 | Singh | ............... | G06K 9/00838 |
| 2017/0352275 A1* | 12/2017 | Maruyama | ............... | B60R 1/003 |
| 2018/0015879 A1* | 1/2018 | Kim | ............... | B60Q 1/525 |
| 2018/0105101 A1* | 4/2018 | Tatara | ............... | F21V 19/00 |

* cited by examiner

FIG. 14
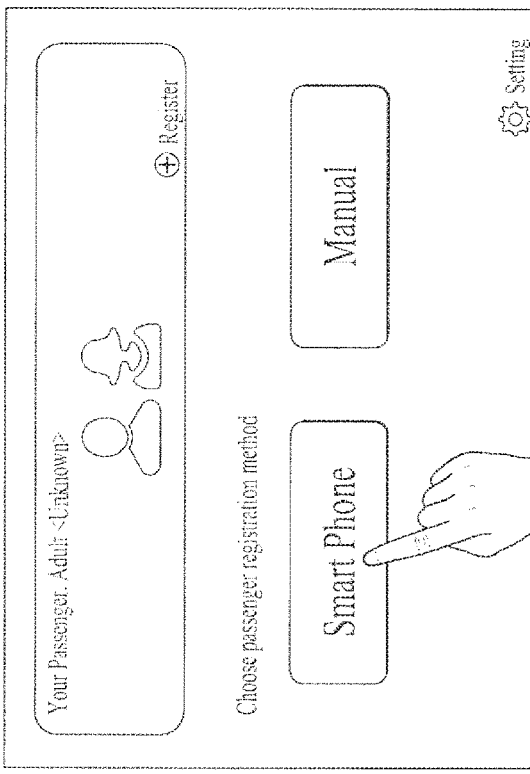
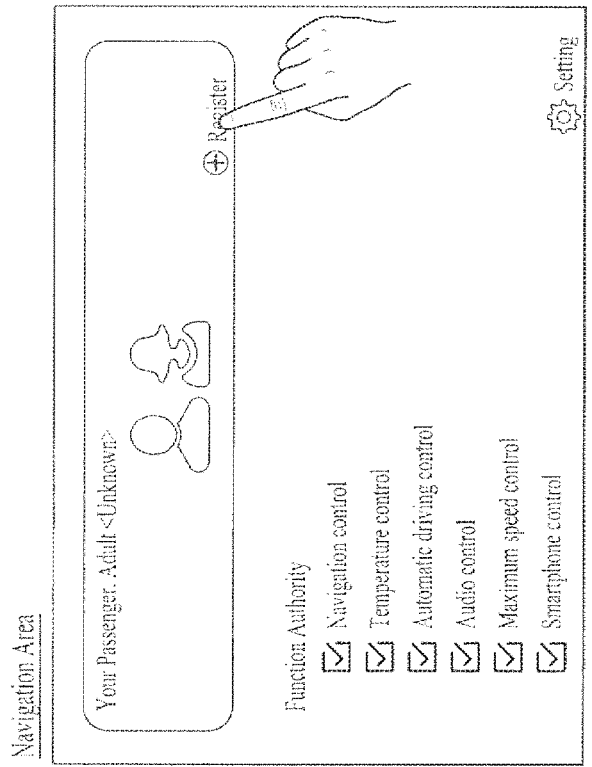

FIG. 21
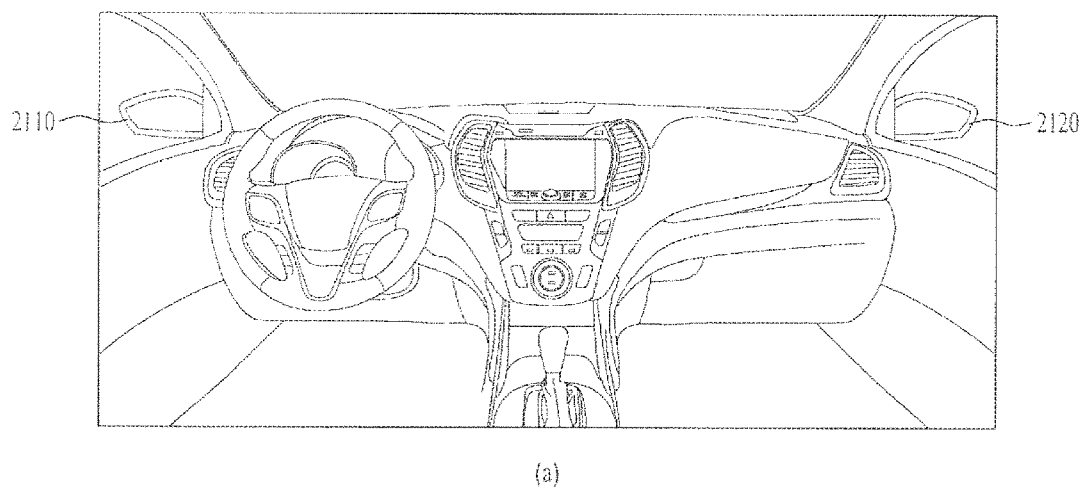
(a)
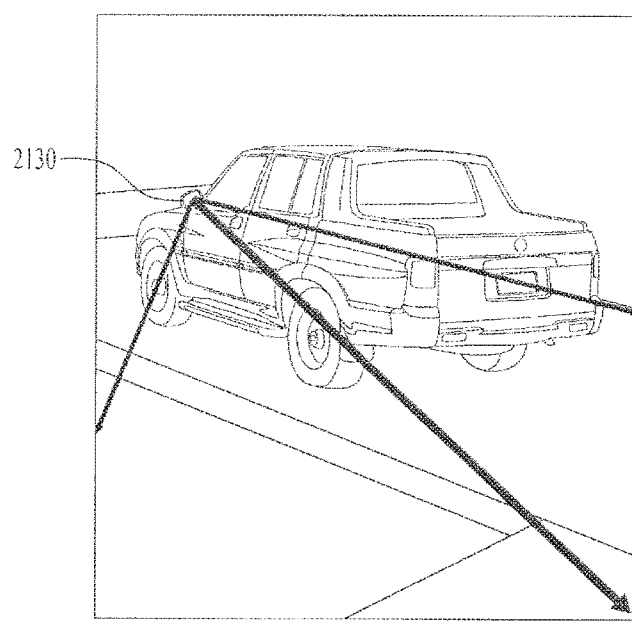
(b)

FIG. 25
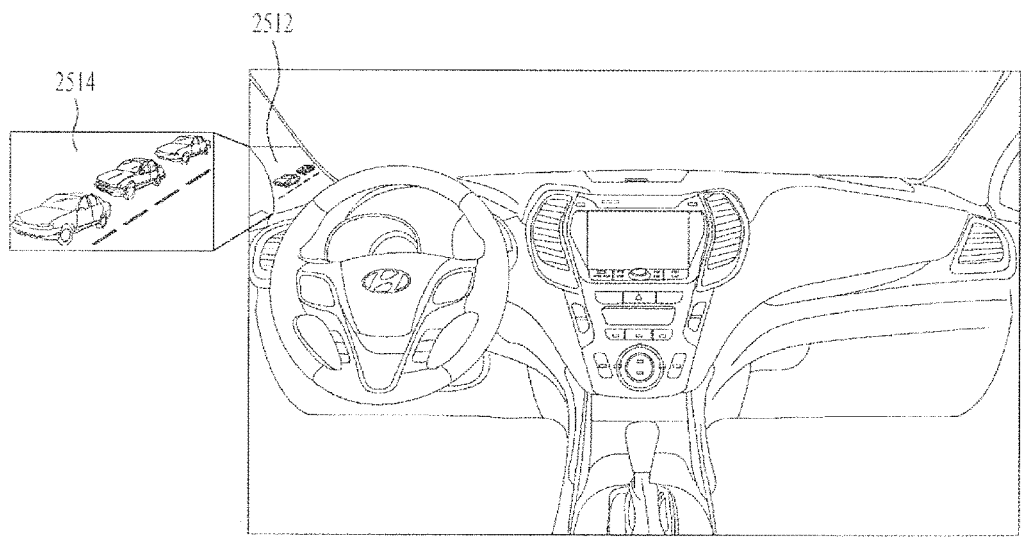
(a)
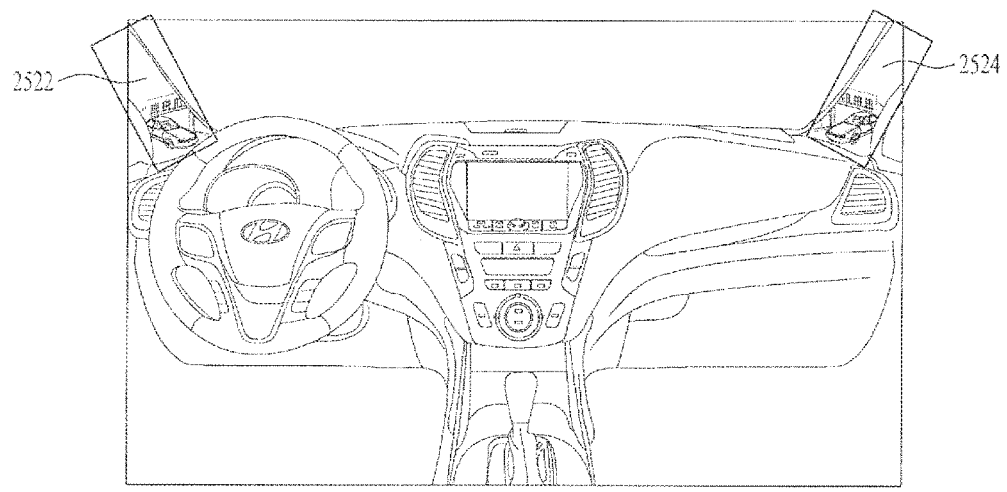
(b)

FIG. 28

| Categorization | Speed | | Place/Location | | Time | | Distance | |
|---|---|---|---|---|---|---|---|---|
| | 40km ↑ | 40km ↓ | Familiar | Unfamiliar | Weekdays | Weekend | Long distance | Short distance |
| Bottom | O | O | O | O | O | O | O | O |
| Top | X | O | X | O | X | O | X | O |

| | | | Operation in main traffic section | Operation out of main traffic section |
|---|---|---|---|---|
| Weekday | Holiday X | Recognition | Familiar lay of land/Work place shift | Unfamiliar lay of land/Business trip |
| | | Display information | Detailed schedule information | Urgent schedule highlight |
| | Holiday O | | Urgent schedule highlight | Detour recommendation, etc. (due to go-slow section) |
| | | Recognition | Familiar lay of land/Tour | Unfamiliar lay of land/Tour |
| | | | Fuel consumption to destination | Nearby famous tourist site and restaurant information |
| Weekend | | Display information | In-section recommended gas station display | Zoom-in display of details on information selection/Destination auto-setting |
| | | | Sale | Recommendation mainly with restaurants according to current hour/ Recommendation fluctuation mainly with landmarks |
| | | | | Restaurant recommendation according to estimated time of arrival at famous restaurant (Although a current hour is not a meal time, if the estimated time of arrival at a famous restaurant is the meal time, the famous restaurant is recommended.) |

FIG. 31
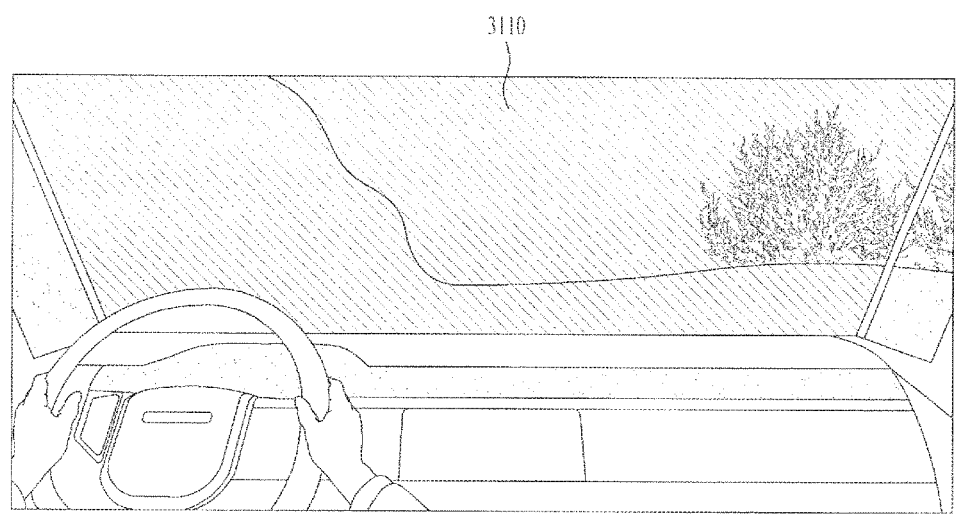
(a)
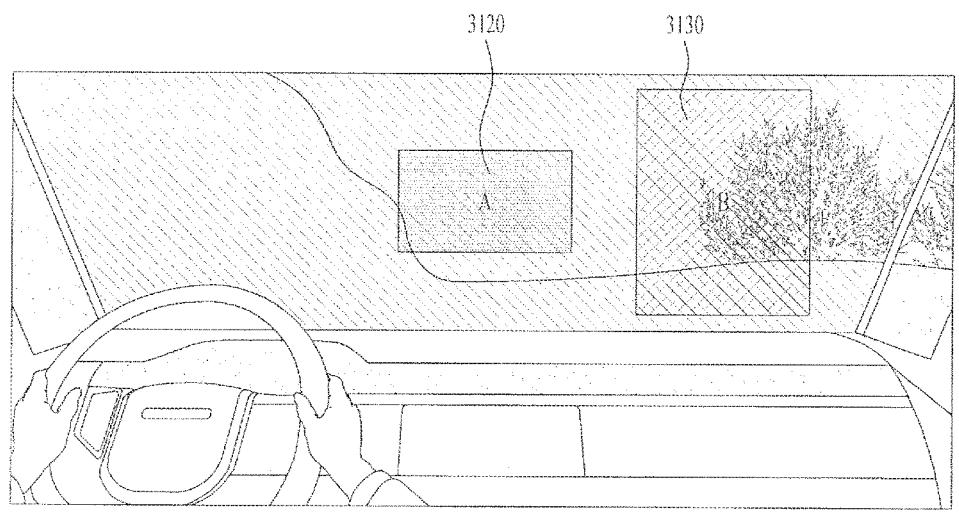
(b)

FIG. 34
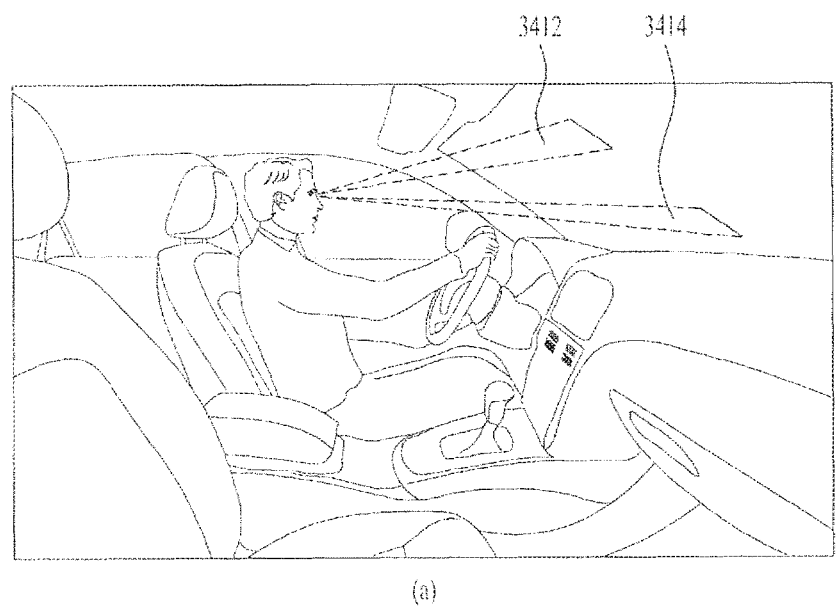
(a)
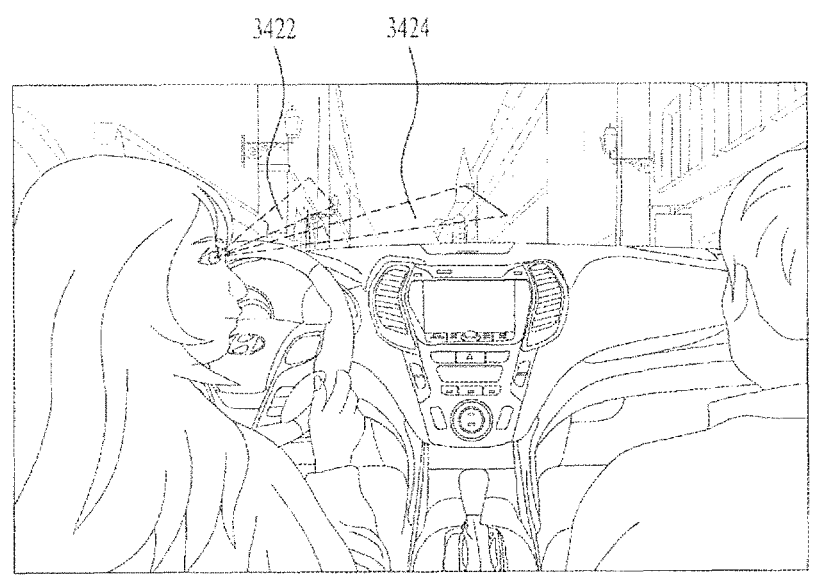
(b)

FIG. 35
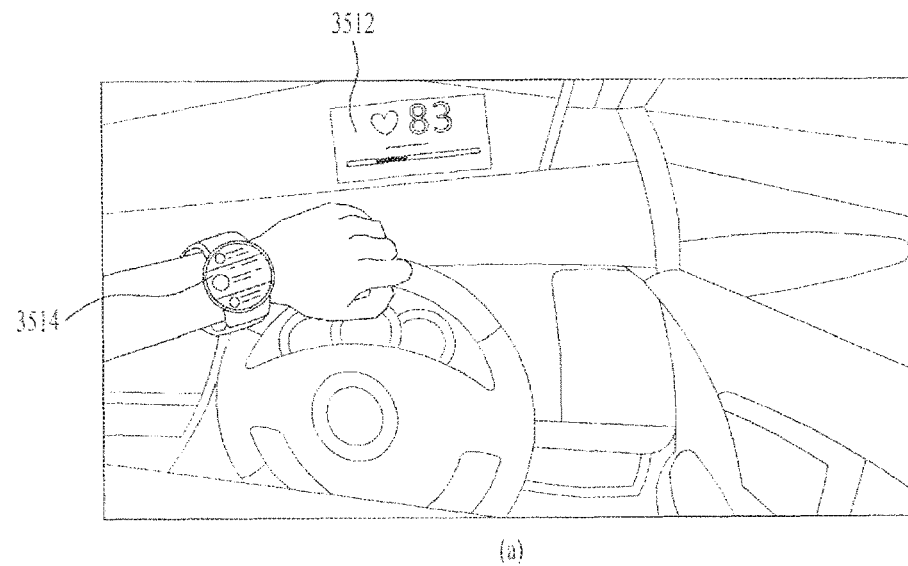
(a)
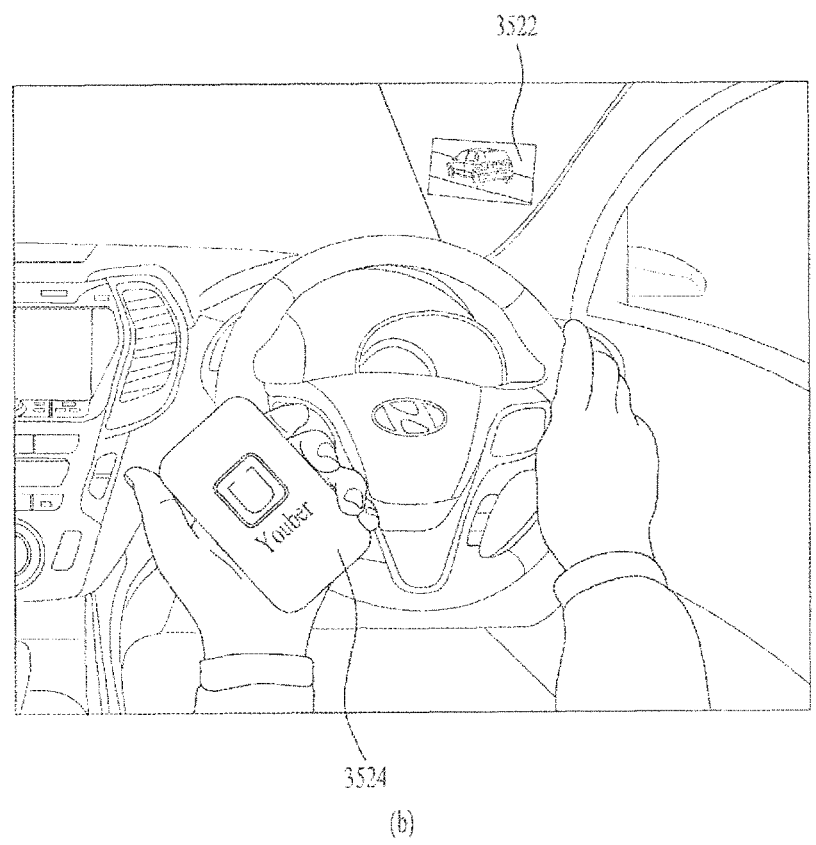
(b)

VEHICLE AND METHOD OF CONTROLLING A DISPLAY THEREIN

Pursuant to 35 U.S.C. § 119(a), this application claims the benefit of earlier filing date and right of priority to Korean Patent Application No. 10-2017-0008183, filed on Jan. 17, 2017, the contents of which are hereby incorporated by reference herein in its entirety.

TECHNICAL FIELD

The present invention relates to a vehicle, and more particularly, to a vehicle and method of controlling a display therein.

BACKGROUND ART

A display device includes both a video recording/playing device and an audio recording/playing device. Such a display device includes a television (TV), a monitor, a projector, a tablet, or the like for example.

As functions of a display device are getting diversified, the display device tends to be implemented as a multimedia player provided with complex functions such as photographing of photos or videos, game play, broadcast reception and the like as well as with functions such as broadcast output and video play.

Meanwhile, such a display device is installed within a vehicle so as to provide various data for driver's convenience. Yet, regarding a related art display device installed within a vehicle, since a display device installed location or region is fixed or limited and has a small display size, the display device causes driver's inconvenience in checking data provided through the display device and the like. Moreover, a related art display device installed within a vehicle just outputs substance limited to preset data kinds or types, e.g., a vehicle state, a vehicle function and the like but fails to actively cope with various events occurring in the course of driving the vehicle or vehicle passenger's demands, thereby causing inconvenience to a vehicle operation.

DISCLOSURE OF THE INVENTION

Technical Tasks

Accordingly, embodiments of the present invention are directed to a vehicle and method of controlling a display therein that substantially obviate one or more problems due to limitations and disadvantages of the related art.

One object of the present invention is to provide an in-vehicle intelligent display configuration and controlling method thereof.

Another object of the present invention is to provide a display, which provides a vehicle use convenience of a vehicle passenger based on a factor (e.g., a vehicle operation mode, a vehicle operation area, a vehicle speed, a vehicle passenger, a vehicle operation time, etc.) and a prescribed combination of various factors.

Further object of the present invention is to enhance vehicle use convenience of all vehicle passengers and cope with various events possible to occur in the course of vehicle operation appropriately.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solution

Additional advantages, objects, and features of various embodiments for a vehicle and method of controlling a display therein will be set forth in the disclosure herein as well as the accompanying drawings. Such aspects may also be appreciated by those skilled in the art based on the disclosure herein. And, the vehicle can support autonomous driving.

To achieve these objects and other advantages and in accordance with the purpose of the invention, as embodied and broadly described herein, a vehicle supportive of auto driving according to the present invention may include sensors, a display including a screen formed on a front glass of the vehicle, and a controller controlling data sensed through at least one of the sensors to be displayed on the screen of the display based on an operation mode of the vehicle and vehicle passenger information.

Technical solutions obtainable from the present invention are non-limited by the above-mentioned technical task solution. And, other unmentioned technical task solutions can be clearly understood from the following description by those having ordinary skill in the technical field to which the present invention pertains.

Advantageous Effects

Accordingly, embodiments of the present invention provide various effects and/or features.

According to one of various embodiments of the present invention, an in-vehicle intelligent display can be configured and controlled.

According to another one of various embodiments of the present invention, a display capable of providing a vehicle use convenience of a vehicle passenger based on a factor (e.g., a vehicle operation mode, a vehicle operation area, a vehicle speed, a vehicle passenger, a vehicle operation time, etc.) and a prescribed combination of various factors can be provided.

According to further one of various embodiments of the present invention, vehicle use convenience of all vehicle passengers can be enhanced and various events possible to occur in the course of vehicle operation can be handled.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 14 is a diagram to describe a method of recognizing/identifying a vehicle passenger through interoperation with a mobile terminal according to the present invention;

FIG. 21 is a diagram of a side mirror installed vehicle related to the present invention;

FIG. 25 is a diagram to describe a method of providing side mirror data of a mirrorless vehicle according to another embodiment of the present invention;

FIG. 28 is a table to describe a displaying method in manual mode of a vehicle operation mode according to one embodiment of the present invention;

FIG. 29 is a table to describe a displaying method in manual mode of a vehicle operation mode according to another embodiment of the present invention;

FIG. 31 is a diagram to describe a method of controlling a display device to cope with an ambient environment according to one embodiment of the present invention;

FIG. 34 is a diagram to describe a method of controlling a display device to cope with vehicle driver's sight according to one embodiment of the present invention;

FIG. 35 is a diagram to describe a method of data communication with other devices in the course of vehicle operation according to one embodiment of the present invention;

BEST MODE

Mode for Invention

Description will now be given in detail according to various embodiment(s) for a vehicle and method of controlling a display therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers. Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies. Meanwhile, the descriptions disclosed in the present specification and/or drawings correspond to one preferred embodiment of the present invention and are non-limited by the preferred embodiment. And, the scope/extent of the right should be determined through the appended claims.

A display device disclosed in the present specification is described by taking a display device installed in a vehicle as one example, by which the scope of a right of the present invention is non-limited.

In the present specification, 'vehicle in operation' may include all cases except a case of vehicle's engine stop. Hence, if 'vehicle in operation' is mentioned in the following description, it's meaning may include a case (e.g., stop, parking, etc.) that the vehicle stands still despite an engine of the vehicle is running, unless mentioned specially.

Figure 1:
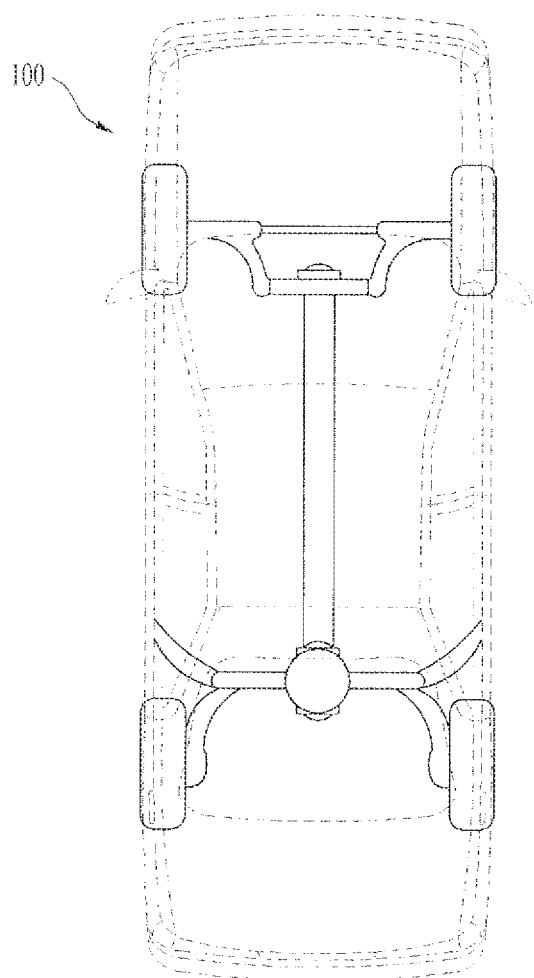
FIG. 1 is a schematic diagram to describe a vehicle including a display device according to the present invention.

FIG. 1 is a schematic diagram to describe a vehicle 100 including a display device according to the present invention.

In the present specification, a vehicle 100 may include one of a pure electric vehicle, a hybrid electric vehicle, and the like as well as a conventional vehicle (e.g., gasoline vehicle, diesel vehicle, natural gas vehicle, etc.) equipped with an internal combustion engine.

The technical idea of the present invention is applicable to a 2-wheel vehicle and a wheel-less vehicle as well as to the aforementioned 4-wheel vehicle, which can be included in the scope of the present invention. Yet, for clarity, the following description is made by taking a 4-wheel vehicle as an example.

Figure 2:
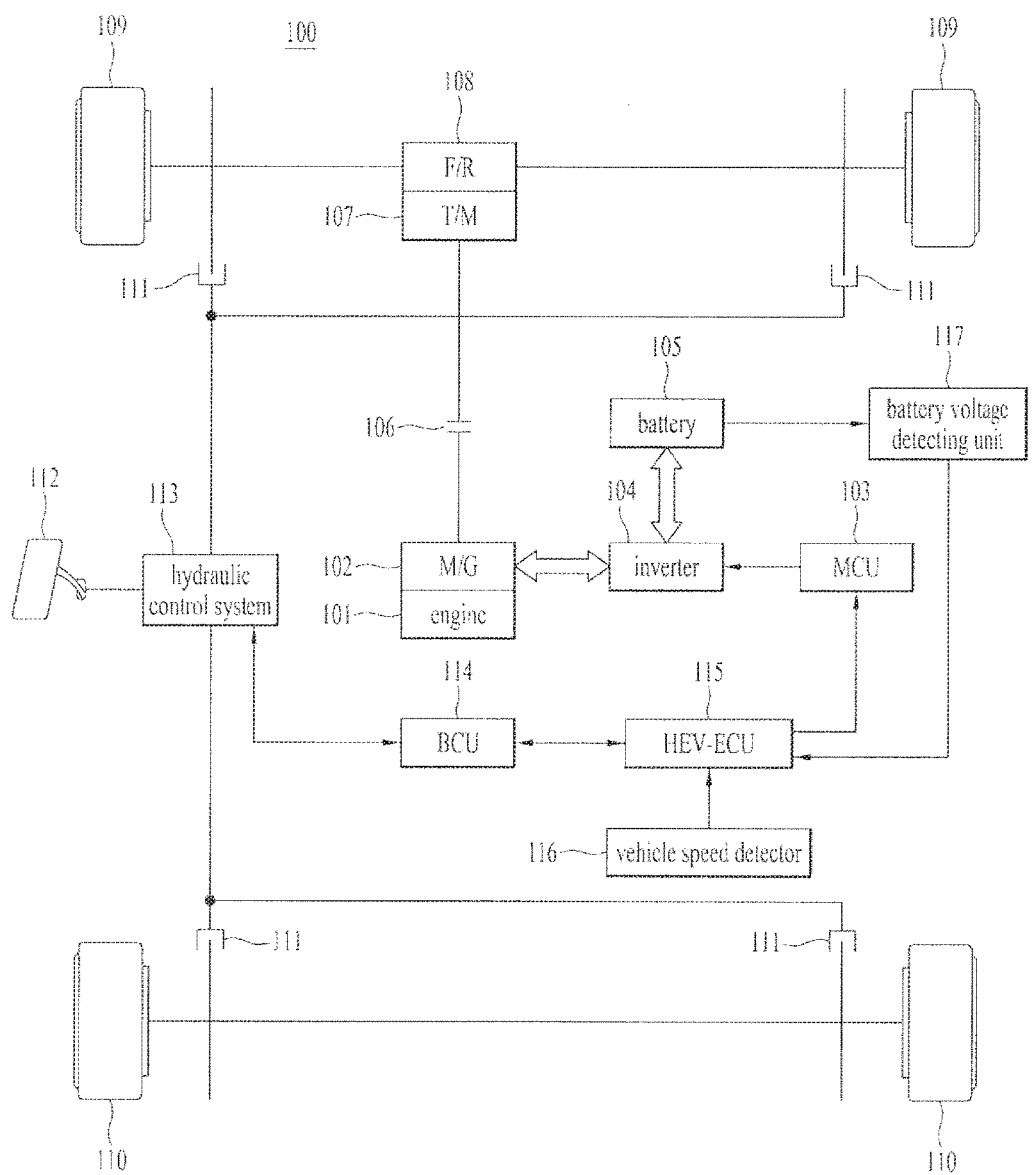
FIG. 2 is a block diagram for a configuration of a vehicle including a display device according to the present invention.

FIG. 2 is a block diagram for a configuration of a vehicle 100 including a display device according to the present invention.

Referring to FIG. 2, a vehicle 100 includes an engine 101 and a motor/generator (M/G) unit 102 as a power source. A driven wheel driven by the power source is a front wheel in a front-wheel drive vehicle or a rear wheel in a rea-wheel drive vehicle. For clarity of the following description, a front-wheel drive vehicle is taken as an example. And, an embodiment for a rear-wheel drive vehicle is apparent from the following description about a front-wheel drive vehicle.

The M/G unit 102 is a device selectively functioning as a motor or generator according to a drive state, which is apparent to those skilled in the art. Hence, although the M/G unit 102 may be called a motor or generator for clarity of the following description, such terms indicate the same component. The engine 101 and M/G unit 102 of the electric vehicle is connected in series to a transmission (T/M).

Under the control of a motor control unit (MCU) 103, the M/G unit 102 is driven by a signal of an inverter 104.

The inverter 114 drives the M/G unit 102 as a power source using electric energy stored in a battery 105. In case of using the M/G unit 102 as a generator, the inverter 104 charges the battery 105 with electric energy generated from the M/G unit 102.

The power of the engine 101 and the M/G unit 102 is transferred to the transmission (T/M) 107 through a clutch 106 and then transferred to a front wheel 109 through a final reduction (drive) gear (F/R) 108. A rear wheel 110 is a non-drive wheel that is not driven by the engine 101 and the M/G unit 102.

A wheel brake apparatus 111 for reducing a revolution speed of a corresponding wheel is inserted in each of the front wheel 109 and the rear wheel 110. And, in order to enable each of the wheel brake apparatuses 111 to be driven, a brake pedal 112 and a hydraulic control system 113 for hydraulically braking each of the wheel brake apparatuses 111 are included. The electric vehicle includes a brake control unit (BCU) 114 configured to control the hydraulic control system 113 and receive a brake control state from the hydraulic control system 113.

When a driver manipulates the brake pedal 112, the BCU 114 detects a hydraulic power generated from the hydraulic control system 113. Based on this, the BCU 114 calculates a braking force to be applied to a drive wheel (e.g., the front wheel 109), a hydraulic braking force to be braked by a hydraulic pressure, and a regenerative braking force to be braked by a regenerative braking. Hence, the BCU 114 supplies the calculated hydraulic braking force to the wheel brake apparatus 111 of the front wheel 109 under the control of the hydraulic control system 113.

The electric vehicle includes a hybrid electric vehicle electronic control unit (HEY-ECU) 115 implementing an electric vehicle that performs a maximum speed limiting method in a manner of controlling the BCU 114 and the MCU 103 by communicating with them.

The regenerative braking force calculated by the BCU 114 is transferred to the HEY-ECU 115. And, the HEY-ECU 115 controls the MCU 203 based on the received regenerative braking force. Hence, the MCU 103 drives the M/G unit 102 as a generator to implement the regenerative braking force specified by the HEY-ECU 115. In doing so, electric energy generated by the M/G unit 102 is saved to the battery 105.

The electric vehicle further includes a vehicle speed detector 116 for detecting a vehicle speed.

The HEY-ECU 115 utilizes the vehicle speed detected by the vehicle speed detector 116 as data for controlling the BCU 114 and the MCU 103.

The electric vehicle includes a battery voltage detecting unit 117 for detecting a voltage of the battery 105. The battery voltage detecting unit 117 detects a current voltage of the battery 105 and then provides result data to enable the HEY-ECU 115 to limit a maximum speed of the electric vehicle according to a deviation between the detected current voltage and a preset reference voltage.

A configuration of a terminal in a vehicle to describe an embodiment of the present invention is described with reference to FIG. 3 as follows.

Figure 3:
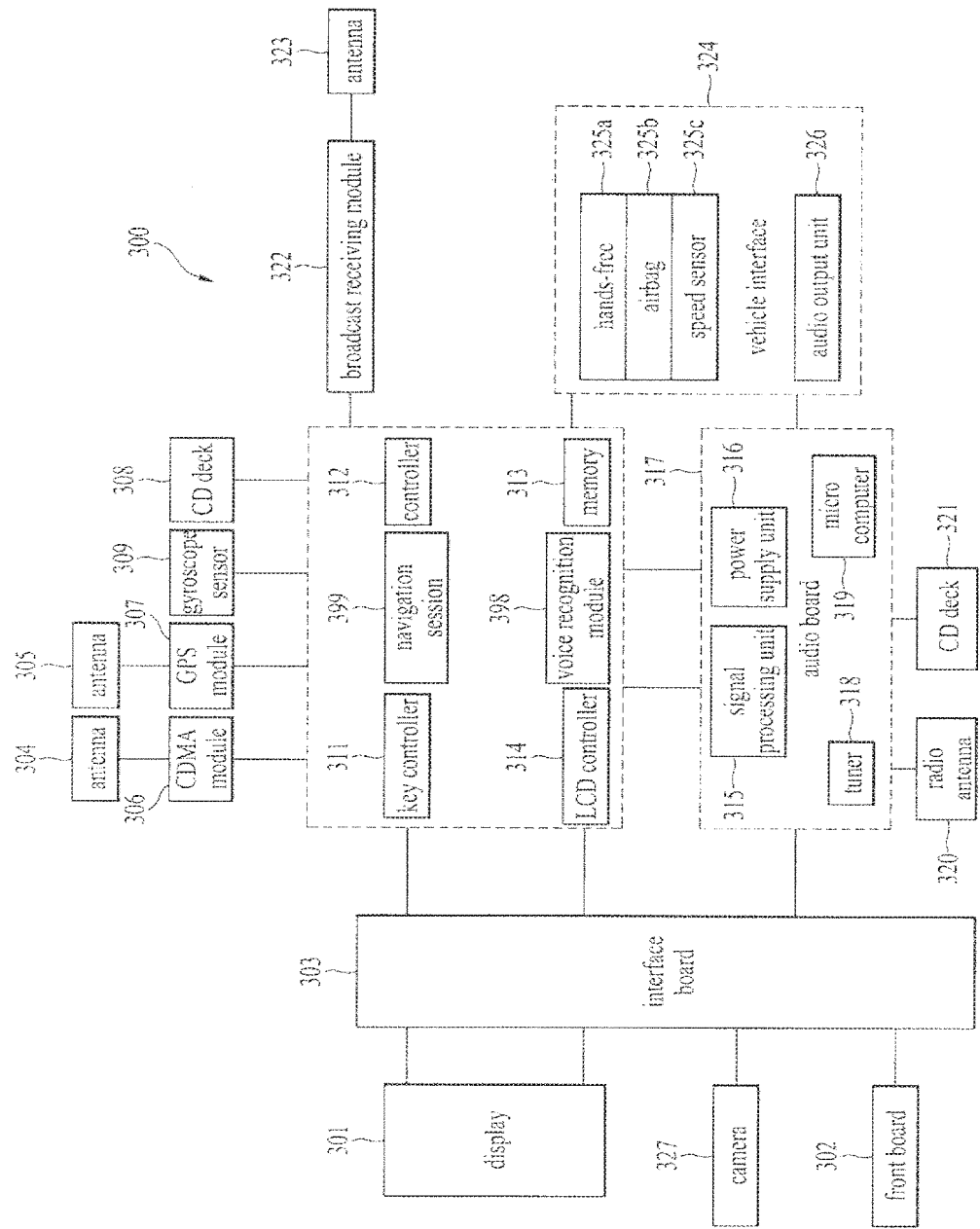
FIG. 3 is a diagram for a configuration of a terminal in a vehicle according to the present invention.

FIG. 3 is a diagram for a configuration of a terminal in a vehicle according to the present invention.

Referring to FIG. 3, a terminal 300 includes a mainboard 310 in which a controller (e.g., a central processing unit (CPU)) 312 controlling the terminal 300 overall, a memory 313 storing various kinds of informations, a key controller 311 controlling various key signals, and a LCD controller 314 controlling a display are built.

The memory 313 stores map information (e.g., map data) for displaying guide or navigation information on a digital map. The memory 313 stores traffic information collection control algorithm, which is provided to input traffic information according to a status of a road of a currently driven vehicle, and information for controlling the algorithm.

The mainboard includes a communication module 306 (i.e., a mobile communication terminal built in a vehicle by having a unique device number given thereto), a GPS module 307 configured to receive a GPS (global positioning system) signal for a vehicle's location guide, a drive route tracking from origination to destination or transmit a GPS signal containing traffic information collected by a user, an audio deck 308 configured to play a signal recorded in an audio recording medium or the like, a gyro sensor 309 and the like. The communication module 306 and the GPS module 307 transmit/receive signals through antennas 304 and 305, respectively.

A broadcast receiving module 322 is connected to the mainboard and receives a broadcast signal through an antenna 323. A display 301 controlled by the display controller 314, a front board 302 controlled by the key controller 311, and a camera 327 configured to capture an inside and/or outside image of the vehicle are connected to the mainboard through an interface board 303.

The display 301 displays various video signals and text signals. The front board 302 is provided with buttons for various key signal inputs and provides a key signal corresponding to a user-selected button to the mainboard 310. The display 301 includes the proximity sensor and the touch sensor (touchscreen). The display 301 may become a HUD (head up display) or a vehicle cluster.

The front board 302 has a menu key for directly inputting traffic information. The menu key may be configured to be controlled by the key controller 311.

The audio board 317 is connected to the mainboard and processes various audio signals. The audio board 317 includes a microcomputer 319 for controlling the audio board 317, a tuner 318 receiving radio signals, a power supply unit 316 supplying a power to the microcomputer 319, and a signal processing unit 315 processing various audio signals.

The audio board 317 includes a radio antenna 320 for receiving radio signals and a CD deck 321 for playing an audio signal of an audio recording medium. The audio board 317 may further include an audio output unit (e.g., amplifier) 326 for outputting a voice signal signal-processed by the audio board 317.

The audio output unit (amplifier) 326 is connected to a vehicle interface 324. Namely, the audio board 317 and the mainboard are connected to the vehicle interface 324. The vehicle interface 324 may be connected to a hands-free 325a for inputting a voice signal, an airbag 325a for passenger's safety, a speed sensor 325c for detecting a vehicle speed, and the like. The speed sensor 325c calculates a vehicle speed and provides the calculated vehicle speed information to the central processing device 312.

A navigation session 399 applied to the terminal 300 generates route guide information based on map data and current vehicle location information and notifies the generated route guide information to a user.

The display 301 detects a proximity touch within a display window through the proximity sensor. For instance, when the display 301 is proximity-touched with a pointer (e.g., finger, stylus pen, etc.), the display 301 detects a location of the proximity touch and then outputs location information corresponding to the detected location to the controller 312.

A voice recognition device (or, voice recognition module) 398 recognizes a voice spoken by a user and performs a corresponding function in response to the recognized voice signal.

The navigation session 399 applied to the terminal 300 displays a driving path on map data. When a location of the mobile terminal is in a range of a predetermined distance from a blind spot included in the driving path, the navigation session 399 automatically establishes a wireless network with a terminal (e.g., a vehicle navigation device) installed in a neighbor vehicle and/or a mobile terminal carried by a neighbor pedestrian through wireless communication (e.g., short-distance wireless communication network). Hence, the navigation session 399 receives location information of the neighbor vehicle from the terminal installed in the neighbor vehicle and also receives location information of the neighbor pedestrian.

A mobile terminal described in the present specification may include one of a mobile phone, a smartphone, a laptop computer, a digital broadcast terminal, a PDA (personal digital assistants), a PMP (portable multimedia player), a navigation system, a slate PC, a tablet PC, an ultrabook, a wearable device (e.g., a smartwatch, a smart glass, an HMD (head mounted display)) and the like.

The mobile terminal may perform data communication with a vehicle through wire/wireless network. The wire/wireless network includes all hardware and/or software for a pairing or/and connection, data communication and the like between the vehicle and the mobile terminal, and also includes all communication networks supported currently or all communication networks that will be supported in the future, by the standards. Meanwhile, the wire/wireless network can support one or more communication protocols for data communication. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), etc.).

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 4:
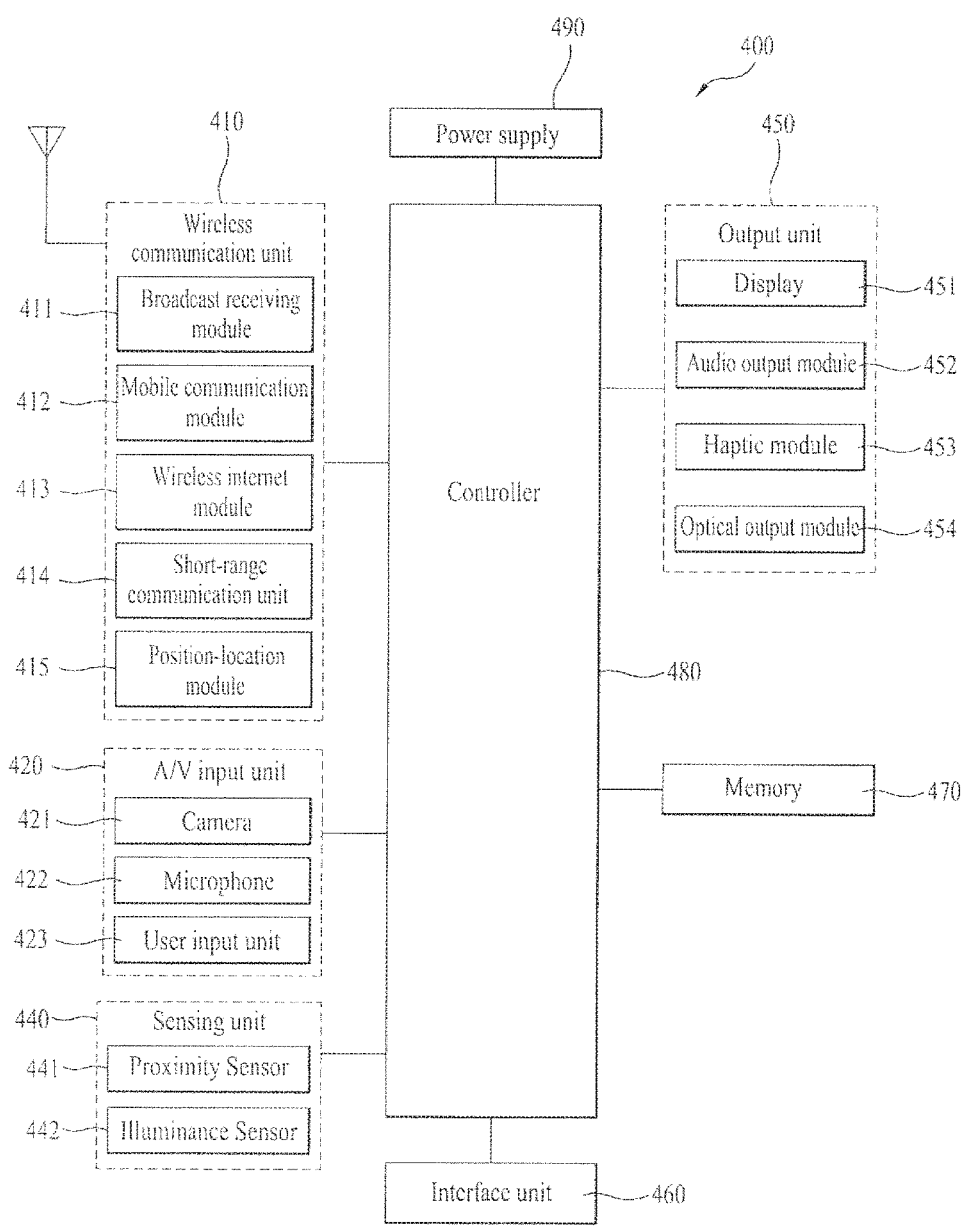
FIG. 4 is a block diagram of a mobile terminal in accordance with the present disclosure.

Reference is now made to FIG. 4, where FIG. 4 is a block diagram of a mobile terminal in accordance with the present disclosure.

The mobile terminal 400 is shown having components such as a wireless communication unit 410, an input unit 420, a sensing unit 440, an output unit 450, an interface unit 460, a memory 470, a controller 480, and a power supply unit 490. It is understood that implementing all of the illustrated components is not a requirement, and that greater or fewer components may alternatively be implemented.

Referring now to FIG. 4, the mobile terminal 400 is shown having wireless communication unit 410 configured with several commonly implemented components. For instance, the wireless communication unit 410 typically includes one or more components which permit wireless communication between the mobile terminal 400 and a wireless communication system or network within which the mobile terminal is located.

The wireless communication unit 410 typically includes one or more modules which permit communications such as wireless communications between the mobile terminal 400 and a wireless communication system, communications between the mobile terminal 400 and another mobile terminal, communications between the mobile terminal 400 and an external server. Further, the wireless communication unit 410 typically includes one or more modules which connect the mobile terminal 400 to one or more networks. To facilitate such communications, the wireless communication unit 410 includes one or more of a broadcast receiving module 411, a mobile communication module 412, a wireless Internet module 413, a short-range communication module 414, and a location information module 415.

The input unit 420 includes a camera 421 for obtaining images or video, a microphone 422, which is one type of audio input device for inputting an audio signal, and a user input unit 423 (for example, a touch key, a push key, a mechanical key, a soft key, and the like) for allowing a user to input information. Data (for example, audio, video, image, and the like) is obtained by the input unit 420 and may be analyzed and processed by controller 480 according to device parameters, user commands, and combinations thereof.

The sensing unit 440 is typically implemented using one or more sensors configured to sense internal information of the mobile terminal, the surrounding environment of the mobile terminal, user information, and the like. For example, in FIG. 4, the sensing unit 440 is shown having a proximity sensor 441 and an illumination sensor 442.

If desired, the sensing unit 440 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 421), a microphone 422, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 400 may be configured to utilize information obtained from sensing unit 440, and in particular, information obtained from one or more sensors of the sensing unit 140, and combinations thereof.

The output unit 450 is typically configured to output various types of information, such as audio, video, tactile output, and the like. The output unit 450 is shown having a display unit 451, an audio output module 452, a haptic module 453, and an optical output module 454.

The display unit 451 may have an inter-layered structure or an integrated structure with a touch sensor in order to facilitate a touch screen. The touch screen may provide an output interface between the mobile terminal 400 and a user, as well as function as the user input unit 423 which provides an input interface between the mobile terminal 400 and the user.

The interface unit 460 serves as an interface with various types of external devices that can be coupled to the mobile terminal 400. The interface unit 460, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 400 may perform assorted control functions associated with a connected external device, in response to the external device being connected to the interface unit 460.

The memory 470 is typically implemented to store data to support various functions or features of the mobile terminal 400. For instance, the memory 470 may be configured to store application programs executed in the mobile terminal 400, data or instructions for operations of the mobile terminal 400, and the like. Some of these application programs may be downloaded from an external server via wireless communication. Other application programs may be installed within the mobile terminal 400 at time of manufacturing or shipping, which is typically the case for basic functions of the mobile terminal 400 (for example, receiving a call, placing a call, receiving a message, sending a message, and the like). It is common for application programs to be stored in the memory 470, installed in the mobile terminal 400, and executed by the controller 480 to perform an operation (or function) for the mobile terminal 400.

The controller 480 typically functions to control overall operation of the mobile terminal 400, in addition to the operations associated with the application programs. The controller 480 may provide or process information or functions appropriate for a user by processing signals, data, information and the like, which are input or output by the various components depicted in FIG. 4, or activating application programs stored in the memory 470. As one example, the controller 480 controls some or all of the components illustrated in FIG. 4 according to the execution of an application program that have been stored in the memory 470.

The power supply unit 490 can be configured to receive external power or provide internal power in order to supply appropriate power required for operating elements and components included in the mobile terminal 400. The power supply unit 490 may include a battery, and the battery may be configured to be embedded in the terminal body, or configured to be detachable from the terminal body.

Referring still to FIG. 4, various components depicted in this figure will now be described in more detail. Regarding the wireless communication unit 410, the broadcast receiving module 411 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 411 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 412.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 411 may be stored in a suitable device, such as a memory 470.

The mobile communication module 412 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 412 include audio call signals, video (telephony) call signals, or various formats of data to support communication of text and multimedia messages.

The wireless Internet module 413 is configured to facilitate wireless Internet access. This module may be internally or externally coupled to the mobile terminal 400. The wireless Internet module 413 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 413 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 413 performs such wireless Internet access. As such, the Internet module 413 may cooperate with, or function as, the mobile communication module 412.

The short-range communication module 414 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 414 in general supports wireless communications between the mobile terminal 400 and a wireless communication system, communications between the mobile terminal 400 and another mobile terminal 400, or communications between the mobile terminal and a network where another mobile terminal 400 (or an external server) is located, via wireless area networks. One example of the wireless area networks is a wireless personal area networks.

In some embodiments, another mobile terminal (which may be configured similarly to mobile terminal 400) may be a wearable device, for example, a smart watch, a smart glass or a head mounted display (HMD), which is able to exchange data with the mobile terminal 400 (or otherwise cooperate with the mobile terminal 400). The short-range communication module 414 may sense or recognize the wearable device, and permit communication between the wearable device and the mobile terminal 400. In addition, when the sensed wearable device is a device which is authenticated to communicate with the mobile terminal 400, the controller 480, for example, may cause transmission of data processed in the mobile terminal 400 to the wearable device via the short-range communication module 414. Hence, a user of the wearable device may use the data processed in the mobile terminal 400 on the wearable device. For example, when a call is received in the mobile terminal 400, the user may answer the call using the wearable device. Also, when a message is received in the mobile terminal 400, the user can check the received message using the wearable device.

The location information module 415 is generally configured to detect, calculate, derive or otherwise identify a position of the mobile terminal. As an example, the location information module 415 includes a Global Position System (GPS) module, a Wi-Fi module, or both. If desired, the location information module 415 may alternatively or additionally function with any of the other modules of the wireless communication unit 410 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 420 may be configured to permit various types of input to the mobile terminal 420. Examples of such input include audio, image, video, data, and user input. Image and video input is often obtained using one or more cameras 421. Such cameras 421 may process image frames of still pictures or video obtained by image sensors in a video or image capture mode. The processed image frames can be displayed on the display unit 451 or stored in memory 470. In some cases, the cameras 421 may be arranged in a matrix configuration to permit a plurality of images having various angles or focal points to be input to the mobile terminal 400. As another example, the cameras 421 may be located in a stereoscopic arrangement to acquire left and right images for implementing a stereoscopic image.

The microphone 422 is generally implemented to permit audio input to the mobile terminal 400. The audio input can be processed in various manners according to a function being executed in the mobile terminal 400. If desired, the microphone 422 may include assorted noise removing algorithms to remove unwanted noise generated in the course of receiving the external audio.

The user input unit 423 is a component that permits input by a user. Such user input may enable the controller 480 to control operation of the mobile terminal 400. The user input unit 423 may include one or more of a mechanical input element (for example, a key, a button located on a front and/or rear surface or a side surface of the mobile terminal 400, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 440 is generally configured to sense one or more of internal information of the mobile terminal, surrounding environment information of the mobile terminal, user information, or the like. The controller 480 generally cooperates with the sending unit 440 to control operation of the mobile terminal 400 or execute data processing, a function or an operation associated with an application program installed in the mobile terminal based on the sensing provided by the sensing unit 440. The sensing unit 440 may be implemented using any of a variety of sensors, some of which will now be described in more detail.

The proximity sensor 441 may include a sensor to sense presence or absence of an object approaching a surface, or an object located near a surface, by using an electromagnetic field, infrared rays, or the like without a mechanical contact. The proximity sensor 441 may be arranged at an inner region of the mobile terminal covered by the touch screen, or near the touch screen.

The proximity sensor 441, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 441 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 441 may sense proximity touch, and proximity touch patterns (for example, distance, direction, speed, time, position, moving status, and the like).

In general, controller 480 processes data corresponding to proximity touches and proximity touch patterns sensed by the proximity sensor 441, and cause output of visual information on the touch screen. In addition, the controller 480 can control the mobile terminal 400 to execute different operations or process different data according to whether a touch with respect to a point on the touch screen is either a proximity touch or a contact touch.

A touch sensor can sense a touch applied to the touch screen, such as display unit 451, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 451, or convert capacitance occurring at a specific part of the display unit 451, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 480. Accordingly, the controller 480 may sense which region of the display unit 451 has been touched. Here, the touch controller may be a component separate from the controller 480, the controller 480, and combinations thereof.

In some embodiments, the controller 480 may execute the same or different controls according to a type of touch object that touches the touch screen or a touch key provided in addition to the touch screen. Whether to execute the same or different control according to the object which provides a touch input may be decided based on a current operating state of the mobile terminal 400 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 480, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 421 typically includes at least one a camera sensor (CCD, CMOS etc.), a photo sensor (or image sensors), and a laser sensor.

Implementing the camera 421 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 451 is generally configured to output information processed in the mobile terminal 400. For example, the display unit 451 may display execution screen information of an application program executing at the mobile terminal 400 or user interface (UI) and graphic user interface (GUI) information in response to the execution screen information.

In some embodiments, the display unit 451 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 452 is generally configured to output audio data. Such audio data may be obtained from any of a number of different sources, such that the audio data may be received from the wireless communication unit 410 or may have been stored in the memory 470. The audio data may be output during modes such as a signal reception mode, a call mode, a record mode, a voice recognition mode, a broadcast reception mode, and the like. The audio output module 452 can provide audible output related to a particular function (e.g., a call signal reception sound, a message reception sound, etc.) performed by the mobile terminal 400. The audio output module 452 may also be implemented as a receiver, a speaker, a buzzer, or the like.

A haptic module 453 can be configured to generate various tactile effects that a user feels, perceive, or otherwise experience. A typical example of a tactile effect generated by the haptic module 453 is vibration. The strength, pattern and the like of the vibration generated by the haptic module 453 can be controlled by user selection or setting by the controller. For example, the haptic module 453 may output different vibrations in a combining manner or a sequential manner.

Besides vibration, the haptic module 453 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 453 can also be implemented to allow the user to feel a tactile effect through a muscle sensation such as the user's fingers or arm, as well as transferring the tactile effect through direct contact. Two or more haptic modules 453 may be provided according to the particular configuration of the mobile terminal 400.

An optical output module 454 can output a signal for indicating an event generation using light of a light source. Examples of events generated in the mobile terminal 400 may include message reception, call signal reception, a missed call, an alarm, a schedule notice, an email reception, information reception through an application, and the like.

A signal output by the optical output module 454 may be implemented in such a manner that the mobile terminal emits monochromatic light or light with a plurality of colors. The signal output may be terminated as the mobile terminal senses that a user has checked the generated event, for example.

The interface unit 460 serves as an interface for external devices to be connected with the mobile terminal 400. For example, the interface unit 460 can receive data transmitted from an external device, receive power to transfer to elements and components within the mobile terminal 400, or transmit internal data of the mobile terminal 400 to such external device. The interface unit 460 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 400 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 400 via the interface unit 460.

When the mobile terminal 400 is connected with an external cradle, the interface unit 460 can serve as a passage to allow power from the cradle to be supplied to the mobile terminal 400 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 470 can store programs to support operations of the controller 480 and store input/output data (for example, phonebook, messages, still images, videos, etc.). The memory 470 may store data related to various patterns of vibrations and audio which are output in response to touch inputs on the touch screen.

The memory 470 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 470 over a network, such as the Internet.

The controller 480 may typically control the general operations of the mobile terminal 400. For example, the controller 480 may set or release a lock state for restricting a user from inputting a control command with respect to applications when a status of the mobile terminal meets a preset condition.

The controller 480 can also perform the controlling and processing associated with voice calls, data communications, video calls, and the like, or perform pattern recognition processing to recognize a handwriting input or a picture drawing input performed on the touch screen as characters or images, respectively. In addition, the controller 480 can control one or a combination of those components in order to implement various exemplary embodiments disclosed herein.

The power supply unit 490 receives external power or provide internal power and supply the appropriate power required for operating respective elements and components included in the mobile terminal 400. The power supply unit 490 may include a battery, which is typically rechargeable or be detachably coupled to the terminal body for charging.

The power supply unit 490 may include a connection port. The connection port may be configured as one example of the interface unit 460 to which an external charger for supplying power to recharge the battery is electrically connected.

As another example, the power supply unit 490 may be configured to recharge the battery in a wireless manner without use of the connection port. In this example, the power supply unit 490 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 400. In such a device, the wearable device generally has functionality that is less than the cooperating mobile terminal. For instance, the short-range communication module 414 of a mobile terminal 400 may sense or recognize a wearable device that is near-enough to communicate with the mobile terminal. In addition, when the sensed wearable device is a device which is authenticated to communicate with the mobile terminal 400, the controller 480 may transmit data processed in the mobile terminal 400 to the wearable device via the short-range communication module 414, for example. Hence, a user of the wearable device can use the data processed in the mobile terminal 400 on the wearable device. For example, when a call is received in the mobile terminal 400, the user can answer the call using the wearable device. Also, when a message is received in the mobile terminal 400, the user can check the received message using the wearable device.

Figure 5:
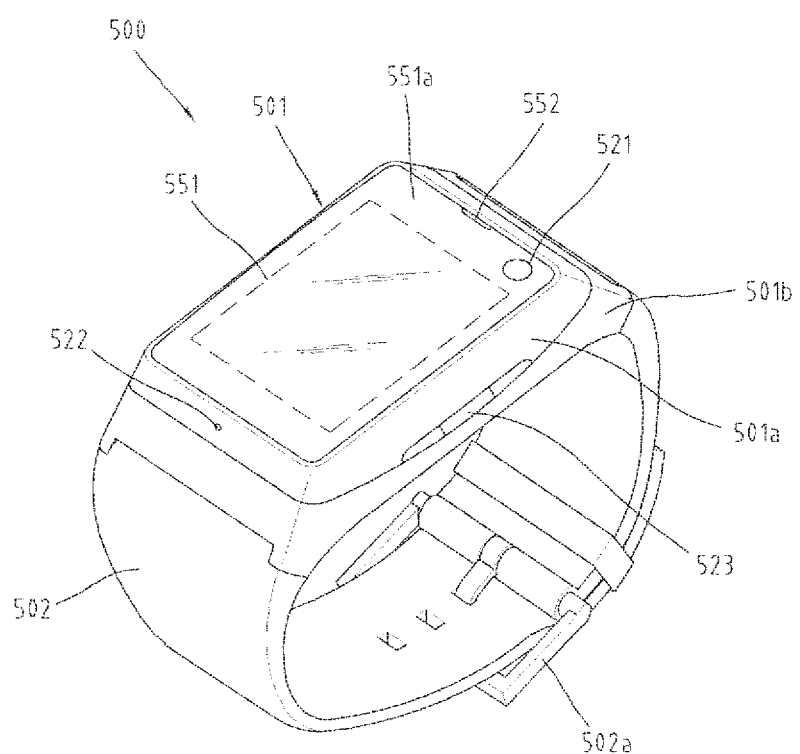
FIG. 5 is a conceptual view of a wearable mobile terminal according to another alternative embodiment of the present disclosure.

FIG. 5 is a perspective view illustrating one example of a watch-type mobile terminal 500 in accordance with another exemplary embodiment. As illustrated in FIG. 5, the watch-type mobile terminal 500 includes a main body 501 with a display unit 551 and a band 502 connected to the main body 501 to be wearable on a wrist. In general, mobile terminal 500 may be configured to include features that are the same or similar to that of mobile terminal 400 of FIG. 4.

The main body 501 may include a case having a certain appearance. As illustrated, the case may include a first case 501a and a second case 501b cooperatively defining an inner space for accommodating various electronic components. Other configurations are possible. For instance, a single case may alternatively be implemented, with such a case being configured to define the inner space, thereby implementing a mobile terminal 500 with a uni-body.

The watch-type mobile terminal 500 can perform wireless communication, and an antenna for the wireless communication can be installed in the main body 501. The antenna may extend its function using the case. For example, a case including a conductive material may be electrically connected to the antenna to extend a ground area or a radiation area.

The display unit 551 is shown located at the front side of the main body 501 so that displayed information is viewable to a user. In some embodiments, the display unit 551 includes a touch sensor so that the display unit can function as a touch screen. As illustrated, window 551a is positioned on the first case 501a to form a front surface of the terminal body together with the first case 501a.

The illustrated embodiment includes audio output module 552, a camera 521, a microphone 522, and a user input unit 523 positioned on the main body 501. When the display unit 551 is implemented as a touch screen, additional function keys may be minimized or eliminated. For example, when the touch screen is implemented, the user input unit 523 may be omitted.

The band 502 is commonly worn on the user's wrist and may be made of a flexible material for facilitating wearing of the device. As one example, the band 502 may be made of fur, rubber, silicon, synthetic resin, or the like. The band 502 may also be configured to be detachable from the main body 501. Accordingly, the band 502 may be replaceable with various types of bands according to a user's preference.

In one configuration, the band 502 may be used for extending the performance of the antenna. For example, the band may include therein a ground extending portion (not shown) electrically connected to the antenna to extend a ground area.

The band 502 may include fastener 502a. The fastener 502a may be implemented into a buckle type, a snap-fit hook structure, a Velcro® type, or the like, and include a flexible section or material. The drawing illustrates an example that the fastener 502a is implemented using a buckle.

Embodiments of a display device and controlling method thereof according to the present invention are described in detail as follows. For clarity, since the display device is installed in a vehicle, it will be named a vehicle terminal in the following description. Such a vehicle terminal can perform data communication with the mobile terminal shown in FIG. 4 or FIG. 5.

Figure 6:
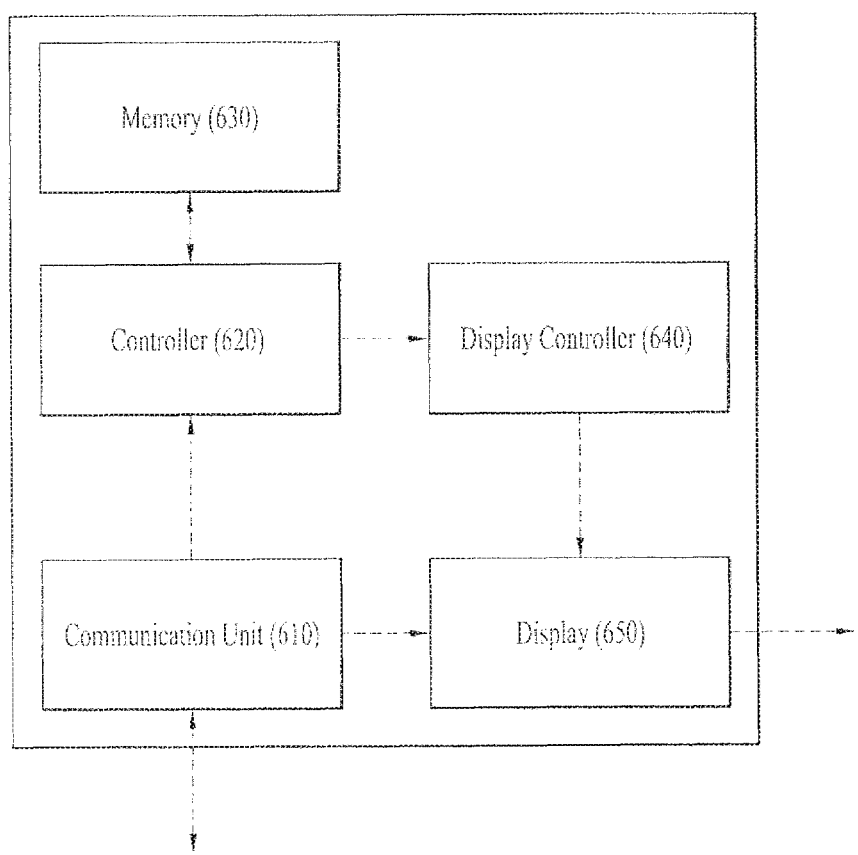
FIG. 6 is a block diagram of a configuration for a vehicle terminal control.

FIG. 6 is a block diagram of a configuration for a vehicle terminal control.

A display device provided to a vehicle includes a memory, a display displaying one or more data areas on a screen, and a controller controlling the display to further display an additional data area based on at least one of recognition or identification of a passenger boarding the vehicle.

The data area may include a driver data area for driver's operation, an operation assistive data area for assisting the driver's operation, or a passenger data area for a passenger.

If not a passenger but a driver exists in the vehicle, the controller may control the display to include at least one of the driver data area and the operation assistive data area.

If a passenger exists in the vehicle as well as a driver, the controller may control the display to include the passenger data area as well as at least one of the driver data area and the operation assistive data area.

The controller may recognize/identify the passenger through at least one of a weight sensor provided to each seat of the vehicle, a camera sensor provided to the vehicle, and a paired mobile terminal.

The controller may control the display to change locations at which the driver data area, the operation assistive data area and the passenger data area are provided.

The controller may control the display to configure the passenger data area based on registration information, which is stored in the memory, on a vehicle passenger, and also control data or settings of each data area, which is provided through the display, to be changed based on the internal/external state of the vehicle.

The controller may determine a priority of the passenger of the vehicle and a priority of the driver of the vehicle and control a data area of the display to be reconfigured based on the determined priorities.

The controller may set a data area access authority of the display to be different according to the recognized/identified passenger or the determined priorities.

Referring to FIG. 6, for a vehicle terminal display control, a vehicle includes a communication unit 610, a controller 620, a memory 630, a display 650 and the like. Herein, the vehicle may further include a separate display controller 640 for a display control.

The communication unit 610 provides an interfacing environment for transmission/reception of various data such as a touch input and the like for an inside and outside of the vehicle, the display and the like.

The controller 620 performs overall controls on the vehicle as well as on the respective components shown in FIG. 6. Particularly, with respect to the present invention, the controller 620 may control the display 650 through the display controller 640 or in direct. Related details shall be described later. Meanwhile, if a following description is made in a manner of naming a vehicle, it may mean the controller 620.

The memory 630 stores various data under the control of the controller 620. As one of data saved to the memory 630, passenger registration information mentioned in the following may be included.

With respect to the present invention, the display 650 is a component configured to perform overall operations for a display of a vehicle terminal provided to a dashboard of a vehicle. The display of the vehicle terminal may be implemented with a touchable screen such as a touchscreen or the like. The display 650 may configure and provide one or more data areas on the screen under the control of the controller 620. The data area may include a driver data area for driver's major operation function, an operation assistive data area for assisting the driver's operation, a passenger data area for a vehicle passenger in case of a presence of the corresponding passenger.

In the following description, a vehicle terminal may inclusively mean not only a display device (e.g., a vehicle display) configured to output data in a vehicle but also at least one in-vehicle configuration supportive of the display device.

Figure 7:
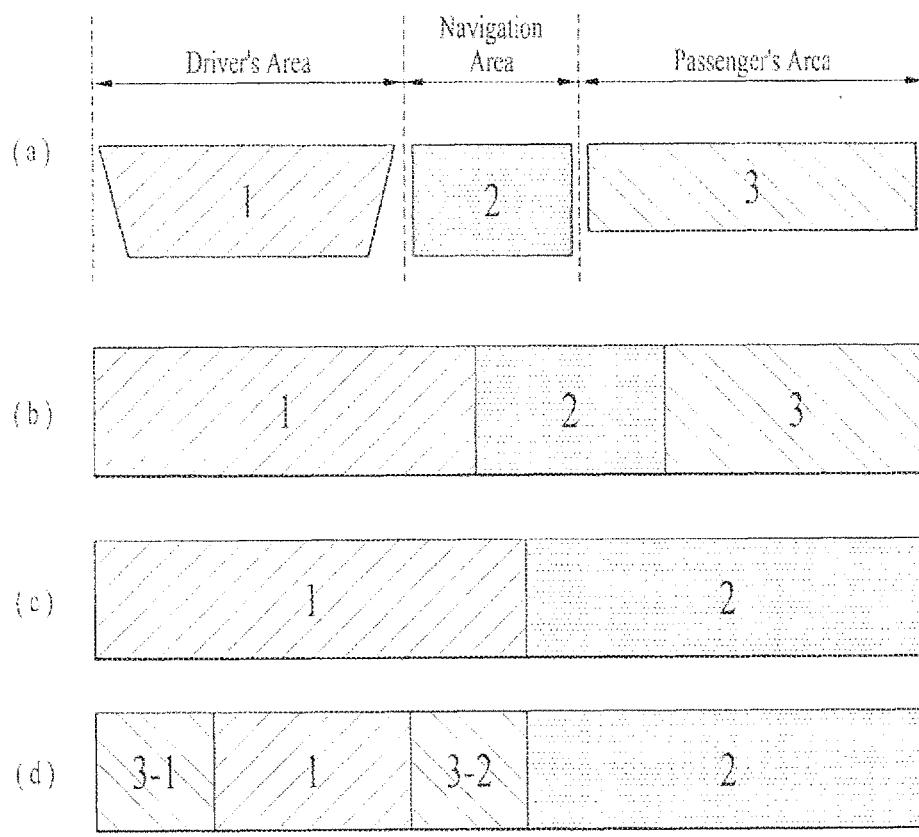
FIG. 7 is a diagram to describe embodiments of an in-vehicle display according to the present invention.

FIG. 7 is a diagram to describe embodiments of an in-vehicle display according to the present invention.

With respect to the present invention, a vehicle terminal may be provided to everywhere inside a vehicle. For instance, a vehicle terminal is generally located on a dashboard of a vehicle or/and a rear side of a seat. The dashboard is generally provided to an area in front of a driver and a corresponding neighbor area. A vehicle terminal located at a rear side of a seat may be provided to the corresponding set in a manner that an embedded or individual display is coupled with the rear side of the seat. Yet, in the present specification, for clarity, to help the understanding of the present invention, the following description is made by taking the vehicle terminal provided on the dashboard as one example.

A vehicle terminal according to the present invention may be provided on a dashboard. A display of the vehicle terminal may include at least two data areas. One is the driver data area and the other may be a driving assistive data area. As described above, the driving assistive data area is a data area that assists the vehicle operation as well as the driver's major operation function. Meanwhile, if a passenger additionally exists in a vehicle, the display of the vehicle terminal may further include the passenger data area.

The aforementioned display of the vehicle terminal provided on the dashboard is integrally formed by hardware. Or, the display of the vehicle terminal may be implemented in a manner of including one or more data areas configured to display the aforementioned data virtually or by software. Alternatively, the display of the vehicle terminal may be implemented in a manner that one or more data areas originally have individual hardware configurations, respectively.

Referring to FIG. 7(a), a data area of a vehicle terminal on a dashboard is divided into a driver data area, an operation assistive data area, and a passenger data area.

FIG. 7(b) shows that a size of a data area of a vehicle terminal is configured different from that shown in FIG. 7(a) some or less.

FIG. 7(c) shows that a data area of a vehicle terminal on a dashboard is divided into a driver data area and other area, unlike FIG. 7(a) or FIG. 7(b).

FIG. 7(d) is similar to FIG. 7(c). Yet, FIG. 7(d) shows that at least one random data area is further provided to a driver data area. Such a random data area may have the same form of a split screen implemented in a display of a general terminal or a form implemented by hardware. Meanwhile, the random data area may include an area from which data corresponding to an image viewable through a side or room mirror of a vehicle is outputted for example.

Meanwhile, the above driver data area is a data area corresponding to all functions, which can be watched or manipulated by a driver seated on a driver seat, and includes a function that can be watched or manipulated by a driver seated on a driver seat in a general vehicle.

The operation assistive data area is an area for providing navigation data for a vehicle driver. Herein, the operation assistive data area may provide data associated with vehicle operation assistance except the navigation data and the data provided through the driver data area. Meanwhile, herein, the operation assistive data area corresponds to the rest of vehicle control functions except the vehicle control function for the driver.

The passenger data area is a remaining region except the driver data area or/and the operation assistive data area. If there is a passenger, the passenger data are means an area for providing data for the passenger. Herein, the passenger data area may provide data associated with a vehicle control like the driver data area or/and the operation assistive data area. In this case, some data may be identical to or associated with data of the above-described areas.

With reference to the description of FIG. 7, a display of a vehicle terminal may include at least area and provide data. Yet, location(s) or provided data of area(s) in the display of the vehicle terminal is not fixed but changeable according to a situation in using a vehicle based on various factors such as 'before operation', 'in operation', 'presence or non-presence of passenger' and the like.

A method of controlling a display of a vehicle terminal according to the present invention is described as follows.

Based on a vehicle state such as 'before operation', 'in operation', 'presence of passenger', or 'end of operation', a display of a vehicle terminal can be configured in various forms. Yet, for clarity, the following description is made by taking a case of 'vehicle in operation (vehicle operation start attempt included). Particularly, a method of controlling a display of a vehicle terminal is described by taking a case that a driver is in a vehicle alone and a case that a driver and an additional passenger (i.e., a fellow passenger) are in a vehicle as examples. Meanwhile, since a vehicle owner is usually a driver, the vehicle owner is described as a driver for clarity. Moreover, for clarity of the following description, a passenger may mean a passenger, i.e., a fellow passenger except a driver.

A vehicle may identify a presence or non-presence of a passenger, i.e., a fellow passenger manually or automatically according to a driver's setting. For instance, if a fellow passenger manual detect mode is set for a vehicle, the vehicle configures and provides a display of a vehicle terminal for a driver only on the assumption of a case that the driver exists only. Yet, in doing so, if a fellow passenger recognition signal is received according to a driver's manual setting, the vehicle may change the display configuration of the vehicle terminal.

Figure 8:
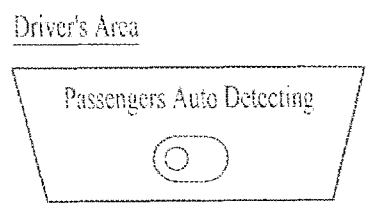
FIG. 8 is a diagram to describe an in-vehicle passenger recognition/identification module according to the present invention.

On the other hand, as shown in FIG. 8, while a fellow passenger auto detect mode is set for a vehicle, if a signal for an operation start is received, the vehicle automatically detects and determines a presence or non-presence of a vehicle passenger (i.e., a fellow passenger) other than a driver. In this case, as described above, a display of a vehicle terminal may differentiate a configuration between a case of a presence of a driver only and a case of a presence of a passenger in the vehicle. Namely, referring to FIG. 8, a vehicle driver can select and change a fellow passenger detect mode manually or automatically.

For instance, in case that a driver boards a vehicle according to the manual or automatic fellow passenger detect mode mentioned above, a vehicle can configure and provide a display of a vehicle terminal in shape shown in FIG. 7(c) or FIG. 7(d). Herein, the display of the vehicle terminal may provide a driver data area and an operation assistive data area only. On the other hand, if at least one passenger exists in a vehicle as well as a driver, the vehicle may configure and provide a display of a vehicle terminal including a passenger data area not like FIG. 7(c) or FIG. 7(d) but like FIG. 7(a) or FIG. 7(b). Meanwhile, in the latter case, the display of the vehicle terminal may be configured differently again based on at least one of the number of fellow passengers, a boarded location of a fellow passenger, an authority of a fellow passenger, and the like. So to speak, if a fellow passenger exists, it may not always mean that the passenger data area is provided in a manner of being included in a display of a vehicle terminal.

With respect to the present invention, a method of recognizing or/and identifying a passenger in a vehicle, i.e., a fellow passenger is described as follows. Herein, for instance, fellow passenger recognition may mean the substance about a presence or non-presence of a fellow passenger having boarded a vehicle, and fellow passenger identification may mean the substance about the number of recognized fellow passengers, a boarded location of a fellow passenger, an authority of a fellow passenger, and the like. Yet, the terms 'fellow passenger recognition' and 'fellow passenger identification' may be used interchangeably without discrimination. Particularly, fellow passenger recognition may include the substance of fellow passenger identification, and vice versa.

Fellow passenger recognition/identification may be performed based on at least one of a weight sensor, a camera sensor (e.g., 3D sensor), a temperature sensor, a heat detection sensor, an audio (voice) sensor, a gyroscope sensor, an acceleration sensor, a scent or odor sensor, a fingerprint sensor and the like, which are provided to a vehicle.

Yet, in the present specification, for clarity, fellow passenger recognition/identification is described by taking a case of making determination based on data sensed by a weight sensor provided to a vehicle, i.e., each seat in the vehicle as one example. As described above, the fellow passenger recognition/identification may be performed through another sensor or a combination with data sensed by another sensor. Moreover, fellow passenger recognition/identification may be performed through data communication such as a pairing or connection with a mobile terminal carried or worn by a passenger separately or together with the sensor.

Figure 9:
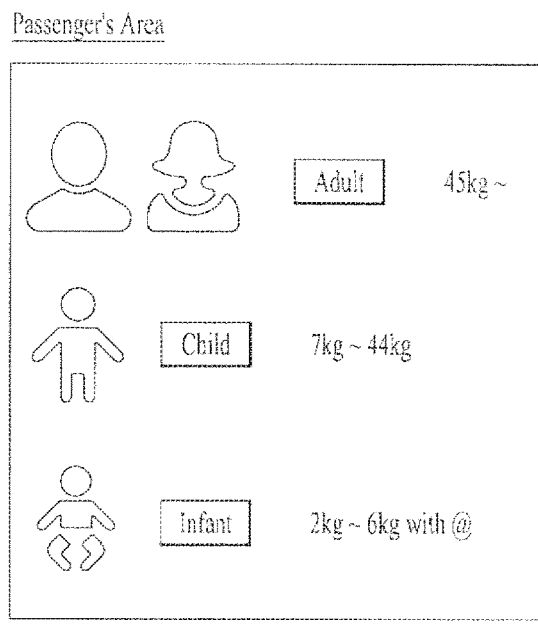
FIG. 9 and FIG. 10 are diagrams to describe a fellow passenger recognizing/identifying method according to the present invention.
Figure 10:
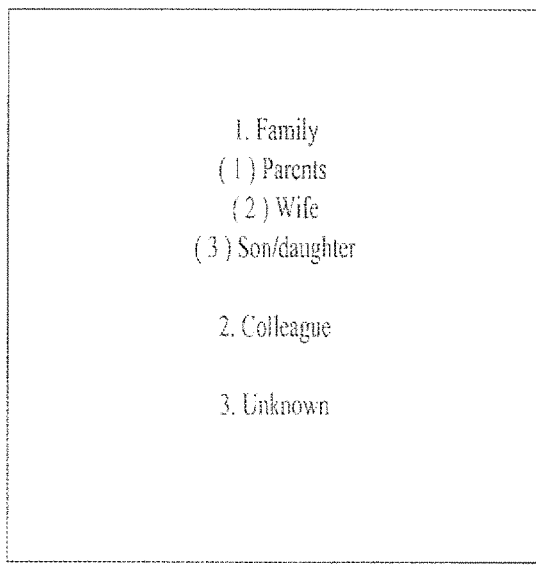

FIG. 9 and FIG. 10 are diagrams to describe a fellow passenger recognizing/identifying method according to the present invention.

First of all, a vehicle may identify a presence or non-presence of boarding of a fellow passenger, the number of fellow passengers, a boarding location or seat of a fellow passenger and the like from data (i.e., weight data of a fellow passenger) sensed by a seat weight sensor provided to a fellow passenger seat.

Hence, as described above, a presence or non-presence of provision of passenger data area data in a vehicle display, a type, kind and attribute of provision data of the passenger data area and the like can be determined.

Meanwhile, referring to FIG. 9, based on such seat weight sensor data, it may identify who a corresponding passenger is.

For instance, a vehicle may identify who a passenger is based on a user' input or setting data. If there is a passenger having boarded the vehicle more than once, the vehicle saves weight data of the corresponding passenger to a memory. Thereafter, the vehicle may use the saved weight data of the passenger for vehicle passenger identification in the future. So to speak, after weight data of a person having boarded a vehicle once has been stored, if the person boards the vehicle again, the corresponding passenger is identified based on the stored weight data.

There are various methods for identifying a passenger.

Yet, in FIG. 9, in identifying a passenger, the passenger is sorted into an adult, a child, a baby, or the like based on weight data sensed through a seat weight sensor, which is taken as one example. For instance, if a weight of a passenger is over 45 kg, a vehicle can sort the passenger into an adult. If a weight of a passenger is between 7~44 kg, a vehicle can sort the passenger into a child. If a weight of a passenger is less than 7 kg, a vehicle can sort the passenger into a baby. Meanwhile, if a baby seat is attached to a seat, a weight of the baby seat is considered or a passenger of the corresponding seat may be regarded as a baby in advance.

Thus, in FIG. 9, based on a weight of a passenger, a passenger is sorted into an adult or the like. Yet, in FIG. 10, for example, a passenger is sorted into a family, a colleague, unknown, or the like.

Referring to FIG. 10, categories include Family, Work or Job, and Unknown, each of which may mean a group. Such substance is applicable to display data in FIG. 8 or the present specification.

So to speak, if Family is selected, subgroups such as parents, wife/husband, children and the like can be identified according to a family member. Moreover, regarding Work or Job, subgroups of various types such as a colleague, a senior, a junior, a client and the like can be identified. And, Unknown may mean a case of a non-presence of passenger registration due to a first boarding on a vehicle or a case of a non-presence of passenger registration despite a presence of a previous boarding history.

Besides, there are various methods of identifying a passenger in various ways as well as FIG. 9 and FIG. 10. And, the present invention is non-limited by the above description.

Meanwhile, identifying a passenger first boarding a vehicle through a weight sensor may be appropriately determined based on the aforementioned weight data. Yet, although a passenger has a vehicle boarding history or is a registered passenger, identifying the passenger having the boarding history or the registered passenger using measured weight sensor data only may be erroneous. For instance, if a previous weight of a registered passenger is different from a weight of a passenger at a boarding time, the corresponding passenger may be recognized as a different passenger or 'unknown' despite the same passenger. On the contrary, if a weight of a different passenger is equal to that of a registered, a vehicle may erroneously recognize the different passenger as a pre-registered passenger despite that the passengers are different from each other. Hence, a vehicle may make a determination by giving an error to weight data of a passenger or further refer to data sensed through at least one different sensor for passenger application. Or, the vehicle may identify a passenger with the sensing data or through a mobile terminal (wearable device included) of the passenger or the like irrespective of the sensing data.

In the present specification, the substance of a fellow passenger is applicable to a driver in the same or similar manner.

Various embodiments for a method of controlling a vehicle or display in case of a presence of at least one fellow passenger as well as a case of a presence of a driver only in the vehicle are described with reference to the aforementioned substance.

Regarding this, in the present specification, a method of controlling a vehicle and a vehicle display is described in a manner of differentiating authority of a corresponding passenger according to an identified passenger such as a fellow passenger is described. For instance, if a passenger has a previous boarding history or a registered passenger is identified, a vehicle may provide a personalized or customized service (hereinafter 'customized service) for vehicle use such as a vehicle operation performed by the corresponding passenger and the like.

Such a customized service may be defined or implemented variously according to the number of passengers, a passenger location, a passenger priority, an environment or condition inside/outside a vehicle, vehicle operation stability, a presence of a paired or connected terminal, or/and a presence or non-presence of a use of the service for example. A scheme of establishing or setting authority for a passenger in a vehicle is described as follows. Yet, this is random and the present invention is non-limited by the scheme disclosed in the present specification.

Various embodiments for a method of controlling a vehicle including a display of a vehicle terminal are described as follows. Such a vehicle control method relates to provision of data personalized for a driver/passenger, control of a content provided to a data area of a vehicle terminal, data communication with a mobile terminal capable of communicating with a vehicle terminal, and the like for example.

Figure 11:
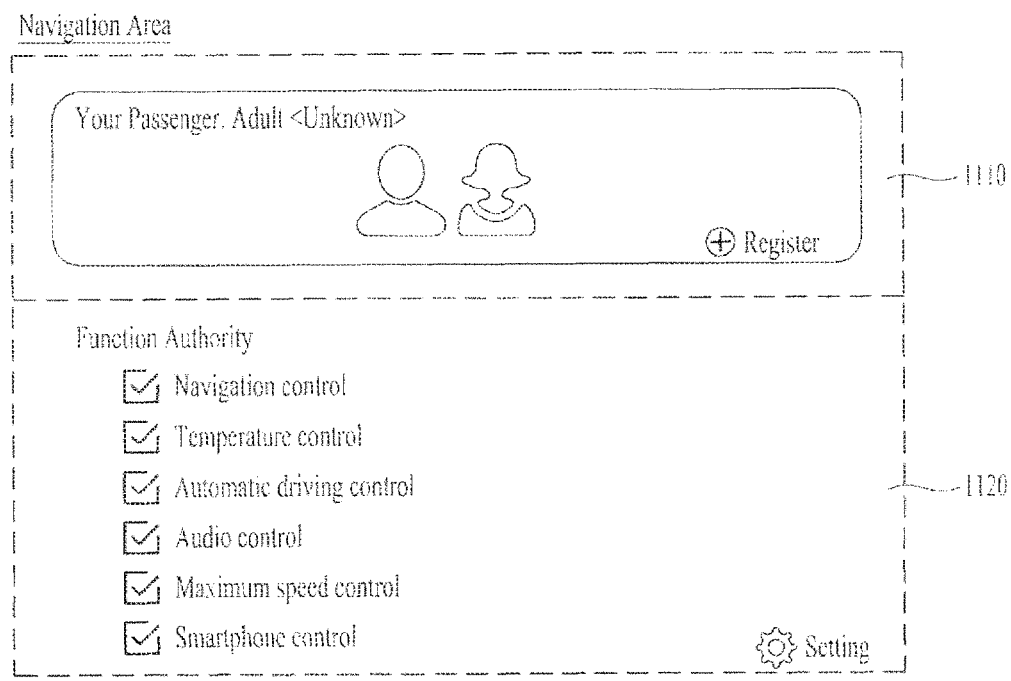
FIG. 11 is a diagram to describe a vehicle passenger authority setting method according to the present invention.
Figure 12:
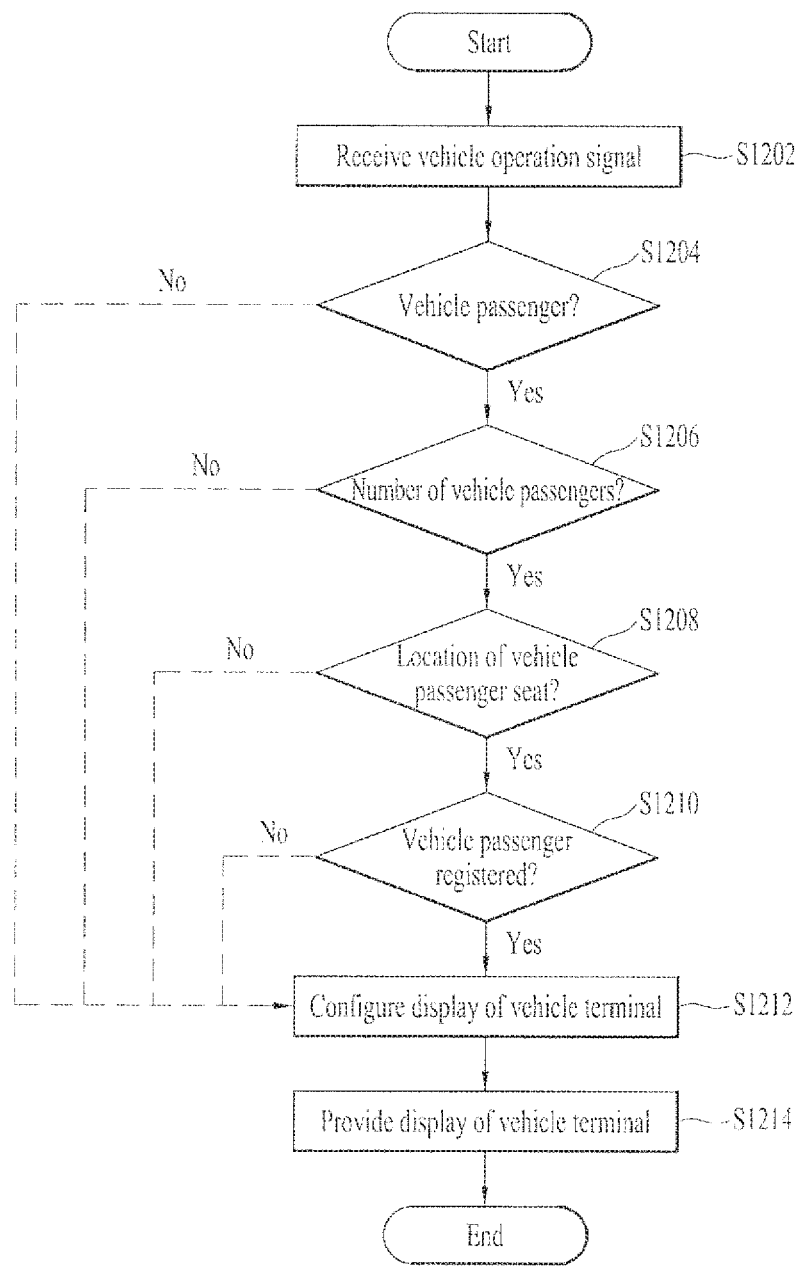
FIG. 12 is a flowchart to describe a method of recognizing/identifying a vehicle passenger and controlling a display according to the present invention.

FIG. 11 is a diagram to describe a vehicle passenger authority setting method according to the present invention. FIG. 12 is a flowchart to describe a method of recognizing/identifying a vehicle passenger and controlling a display according to the present invention.

As described above, when a vehicle starts an operation, it recognizes and identifies a vehicle passenger other than a driver. Thus, a display configuration of a vehicle terminal may vary according to the identified driver and vehicle passenger.

Herein, the recognition and identification of the vehicle passenger, a fellow passenger include the number of fellow passengers, a boarding location of a fellow passenger and the like.

Referring to FIG. 11, information on a driver/fellow passenger recognized by a vehicle may be provided to at least one of data areas of a vehicle terminal.

If a vehicle recognizes that a fellow passenger exists, it can identify the recognized fellow passenger. Once the recognized fellow passenger is identified, various menus are provided to enable authority to be set for the identified fellow passenger. If the recognized fellow passenger is not identified, the corresponding fellow passenger is handled into 'unknown' and a menu for registering as a vehicle passenger can be provided.

Meanwhile, if the identified fellow passenger is already registered and the authority setting is completed, the vehicle can give advance notice of the authority setting substance.

In FIG. 11, data including information on a recognized/identified boarding, an icon for registration of an unregistered passenger and the like may be provided to a first subarea 1110 in a data area of a vehicle terminal.

Meanwhile, authority setting items related to a vehicle function use and the like are provided to a second subarea 1120 in the data area of the vehicle terminal shown in FIG. 11.

As described above, FIG. 12 is a flowchart showing a method of controlling a display of a vehicle terminal and a vehicle.

First of all, if a vehicle operation start signal is inputted [S1202], a vehicle determines a presence or non-presence of a vehicle passenger other than a driver [S1204].

As a result of the determination of the step S1204, if the vehicle passenger other than the driver is recognized, the number of the recognized vehicle passengers is determined [S1206]. Simultaneously, the vehicle determines a boarding seat location of the recognized vehicle passenger [S1208]. Herein, the step S1206 may be bypassed according to a system without determination.

As a result of the determination of the step S1206, if the number of the recognized vehicle passengers is plural, the vehicle determines whether each of the recognized vehicle passengers is registered at the vehicle [S1210].

As a result of the determination of the step S1208, if the seat location of the recognized vehicle passenger is identified, the vehicle determines whether the identified vehicle passenger is registered at the vehicle [S1210].

As a result of the determination of the step S1206, if at least one of the recognized vehicle passengers is registered, the vehicle configures a display of a vehicle terminal by referring to the authority setting substance previously set for the corresponding registered passenger [S1212].

The vehicle provides data according to the configuration to a data area of the vehicle terminal [S1214].

Meanwhile, as a result of the determination of the step S1208, if the seat of the vehicle passenger is not a seat next to a driver, the vehicle may configure the display of the vehicle terminal like a case of a driver on board only irrespectively of a presence or non-presence of registration of the vehicle passenger. Yet, in this case, although the vehicle passenger is seated on a rear seat in the vehicle, if the pre-registered authority setting substance exists, the vehicle may provide some or all of the substance to a display of a vehicle terminal related to the corresponding seat.

Or, as a result of the determination of the step S1208, if a seat of the vehicle passenger is a seat next to the driver, the vehicle configures the display of the vehicle terminal correspondingly [S1212] and provides data according to the configuration to a data area of the vehicle terminal [S1214].

Herein, if the vehicle passenger seated on the passenger seat next to the driver is a passenger unregistered at the vehicle, when the display of the vehicle terminal is configured in the step S1212, data for registration guidance and authority setting can be provided.

Yet, if the vehicle passenger seated on the passenger seat next to the driver is a passenger registered at the vehicle, the vehicle can directly provide the display of the vehicle terminal reflecting the preset authority setting substance.

In FIG. 11, with respect to the authority of the passenger registered at the vehicle, the substance about the vehicle functions is taken as one example for the description, authority settings may be performed on other various substances.

After the recognition/re-recognition and identification of a vehicle passenger, an authority setting may be performed differently according to the identified vehicle passenger. This may be performed manually or automatically.

For instance, if a recognized vehicle passenger is identified as an adult, full in-vehicle use authority may be assigned to the corresponding passenger. Preferably, the full use authority is equal to or less than that of a driver. Yet, if the recognized vehicle passenger is recognized as a child or baby, the in-vehicle use authority may be assigned to the corresponding passenger partially or minimally or none of the in-vehicle use authority may be assigned to the corresponding passenger. The reason is described as follows. First of all, if the identified vehicle passenger is a child or baby, it is highly probable that the identified vehicle passenger is lack of knowledge of the vehicle or makes a wrong selection. Hence, it is able to prevent occurrence of safety problems in the course of operating the vehicle.

According to another authority setting scheme, an identified vehicle passenger is categorized in to a female case or a male case based on gender, and an in-vehicle use authority or a usable content is preset and provided correspondingly. For instance, in case of attempting to play music in the course of operating a vehicle, if an identified vehicle passenger is a female, music in ballad genre may be preferentially played. If an identified vehicle passenger is a male, music in rock genre may be preferentially played.

Besides, with reference to a presence or non-presence of family of the identified vehicle passenger as well as an age, a gender and the like, authority can be set variously and a display of a vehicle terminal customized for the passenger can be configured.

Meanwhile, if the number of the recognized vehicle passengers is 1 or plural, a use authority of a display of a vehicle terminal can be differentiated based on a result of identification of the vehicle passenger(s).

For instance, although the number of the recognized vehicle passenger is 1, based on the priority between a driver and the identified vehicle passenger, display use authority of a vehicle terminal and the like may be configured differently. For instance, if a priority of a vehicle passenger other than a driver is higher than that of the driver, a display of a vehicle terminal is configured in a manner of including an area for the vehicle passenger. Otherwise, a display of a vehicle terminal can be configured in a manner of including an area for the driver only.

Moreover, if the number of the recognized vehicle passengers is plural, whether to configure a display use authority of a vehicle terminal with reference to a prescribed one of a plurality of the identified vehicle passengers can be determined based on the priorities among the identified vehicle passengers. For instance, assuming that 3 vehicle passengers exist, a display of a vehicle terminal can be configured and provided with reference to the vehicle passenger having a highest priority. In doing so, if a boarding seat location of the vehicle passenger having the highest priority is not a seat next to a driver or the corresponding vehicle passenger has the priority lower than that of the river, a display of a vehicle terminal may be configured and provided in a manner of including an area for the driver only without configuring the former display of the vehicle terminal including the area for the passenger.

Figure 13:
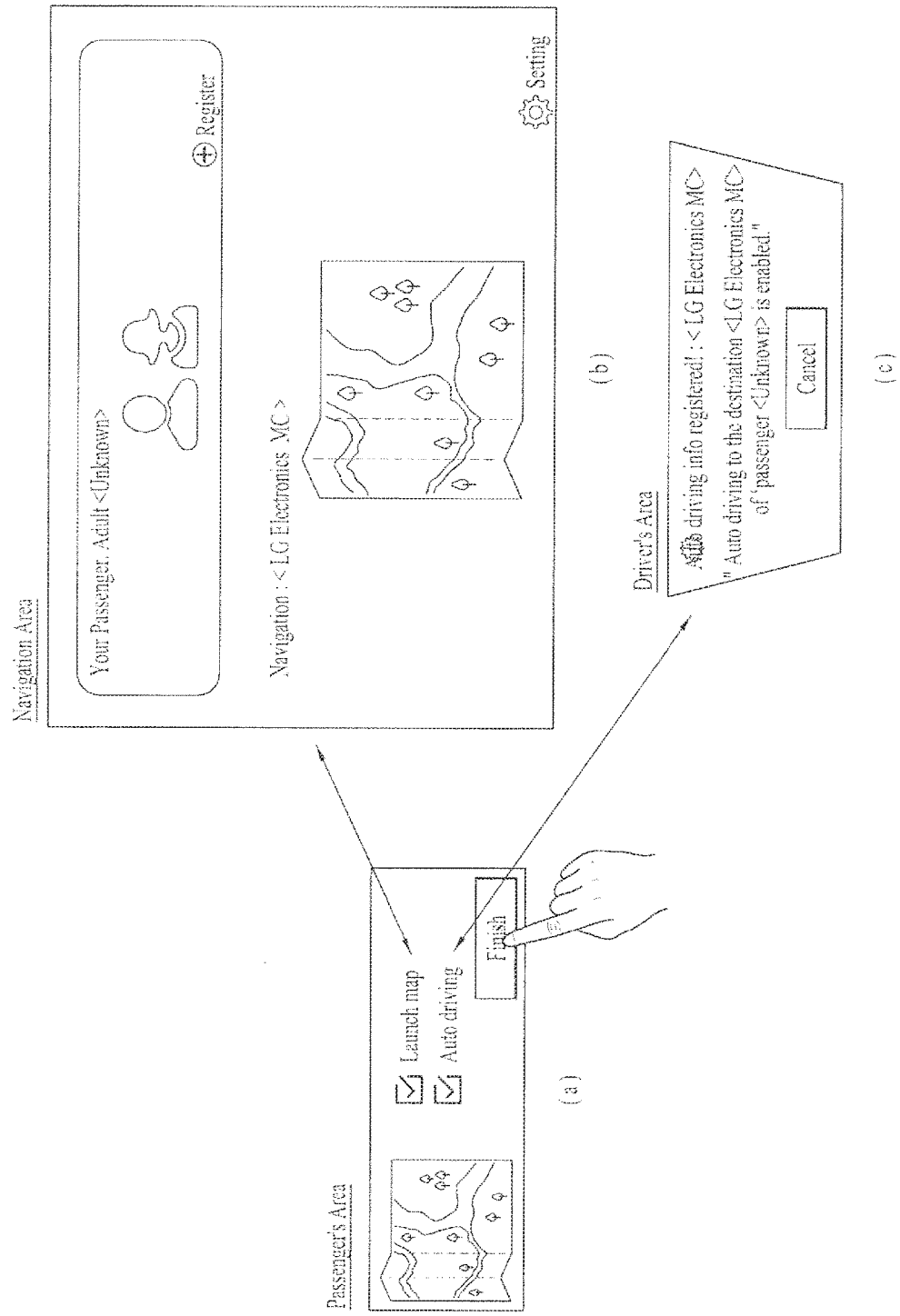
FIG. 13 is a diagram to describe a method of controlling a display of a vehicle terminal according to the present invention.

Referring to FIG. 13(a), for instance, navigation data may be provided to a passenger data area in a data area of a vehicle terminal. Herein, authority of a vehicle passenger, who is a fellow passenger, may include navigation authority for example.

Referring to FIG. 13(a), regarding navigation data, an item for desiring to launch map data and an auto driving item may be provided.

If a launching item selection signal of map data in the navigation data of the passenger data area is received, as shown in FIG. 13(b), a vehicle provides map data to the passenger data area or another area, e.g., an operation assistive data area other than the passenger data area of the vehicle terminal. A passenger or driver may set navigation data such as destination, route and the like based on the provided map data. Herein, data of the vehicle passenger is provided or saved together with the navigation data. Thereafter, if the corresponding vehicle passenger is identified, the provided or saved data can be used for recommendation and the like.

Yet, if a selection signal of an auto driving item in the navigation data of the passenger data area is received, the vehicle may provide data shown in FIG. 13(c) to the driver data area or the operation assistive data area. The data shown in FIG. 13(c) may include vehicle passenger information, destination information, and auto driving request information for example. In this case, the driver may accept rove or decline the request shown in FIG. 13(c). Besides, the auto driving may be called autonomous driving.

As described above, in identifying a recognized vehicle passenger, a vehicle may use a mobile terminal carried or retained by the vehicle passenger.

FIG. 14 is a diagram to describe a method of recognizing/identifying a vehicle passenger through interoperation with a mobile terminal according to the present invention.

FIG. 14(a) may show data provided to one of data regions of a vehicle terminal by a vehicle if an unregistered vehicle passenger is identified.

Referring to FIG. 14(a), a vehicle may provide data indicating whether the identified vehicle passenger is registered at the vehicle and data for authority setting items of the corresponding vehicle passenger.

Unlike FIG. 14(a), FIG. 14(b) shows that in recognizing and identifying a vehicle passenger, the vehicle passenger or a driver may be allowed to register the corresponding vehicle passenger manually in direct or select whether to make a registration through a mobile terminal such as a smartphone.

In the latter case, when a vehicle passenger is recognized/identified using weight sensing data through the weight sensor of the seat, a weighty stuff, an inanimate object or the like may be recognized as a vehicle passenger according to the weight sensing data so as to cause a malfunction such as data provision according to the recognition. Hence, the latter case can prevent the occurrence of the malfunction.

Figure 15:
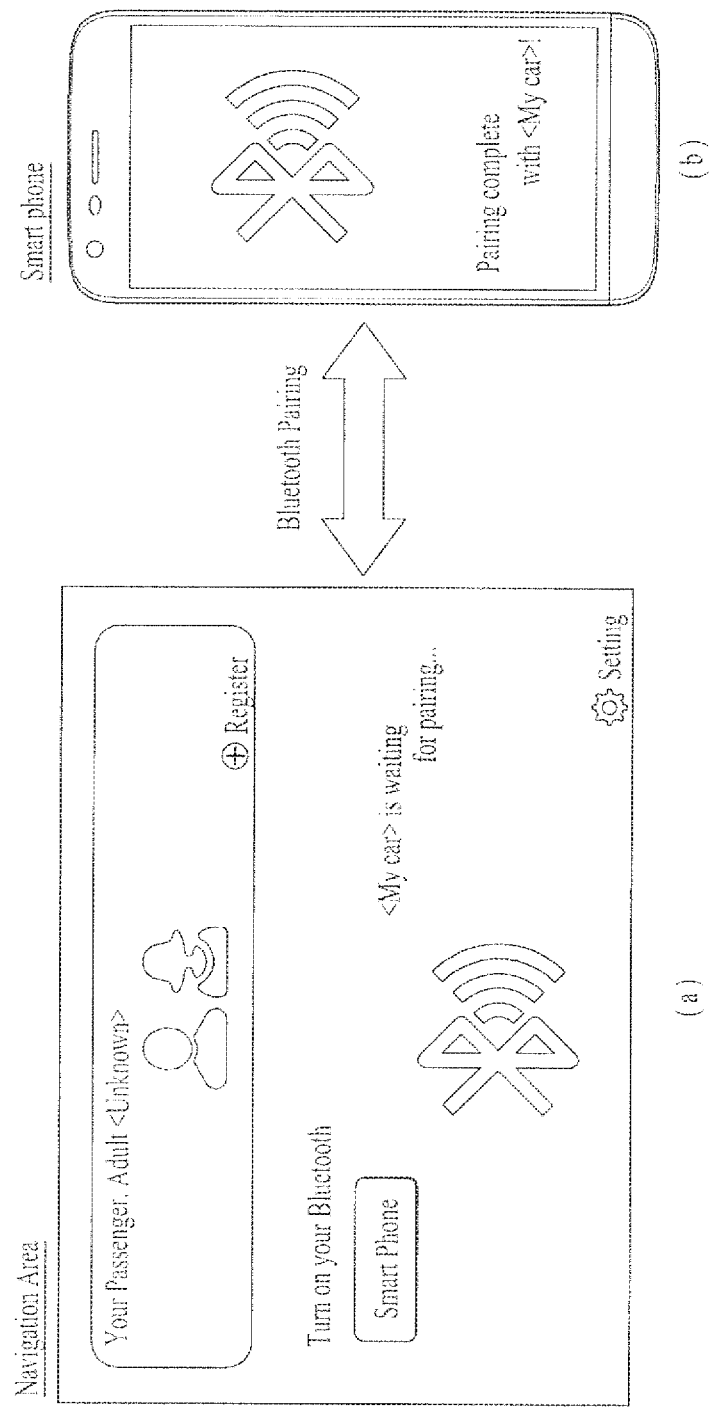
FIG. 15 is a diagram to describe a method of recognizing/identifying a vehicle passenger using a mobile terminal according to the present invention.

FIG. 15 is a diagram to describe a method of recognizing/identifying a vehicle passenger using a mobile terminal according to the present invention.

FIG. 15 shows a case of recognizing and identifying a mobile terminal of a passenger in a vehicle if the mobile terminal item is selected in FIG. 14(b).

In order to determine a presence or non-presence of a mobile terminal within a predetermined range according to a prescribed communication protocol, as shown in FIG. 15(a), a vehicle broadcasts or advertises a signal. If the mobile terminal sends a response signal in response to a reception of the broadcasting or advertising signal sent from the vehicle, the responding mobile terminal and the vehicle are paired with each other as shown in FIG. 15(b). In doing so, assuming an inside or ambience of the vehicle, the prescribed communication protocol may mainly user Bluetooth, Wi-Fi or the like for example. In FIG. 15, Bluetooth is used for clarity.

Thus, after such a pairing has been established once, if a passenger carrying the mobile terminal enters a car ambience or a car inside, the vehicle may establish a pairing in advance without a separate action or input of a driver or a vehicle passenger, recognize and identify the vehicle passenger, and then configure a display of a vehicle terminal based on the recognition and identification.

Meanwhile, when a vehicle recognizes/identifies a vehicle passenger for an operation, if the number of mobile terminal(s) paired in case of using the mobile terminal(s) is 1 or plural, a corresponding process can be handled as described above. For instance, if there is one paired mobile terminal, the vehicle may determine a priority between a driver and a vehicle passenger identified through the mobile terminal and configure a display of a vehicle terminal according to a corresponding result, as described above. Moreover, if a plurality of the paired mobile terminals exist, the vehicle may configure a display of a vehicle terminal with reference to a vehicle passenger having a highest priority among a plurality of vehicle passengers identified through a plurality of the mobile terminals. Meanwhile, if the vehicle passenger having the highest priority does not correspond to a seat next to a driver or the vehicle passenger's priority is lower than that of the driver, the vehicle may configure a display of a vehicle terminal unlike the above description.

Figure 16:
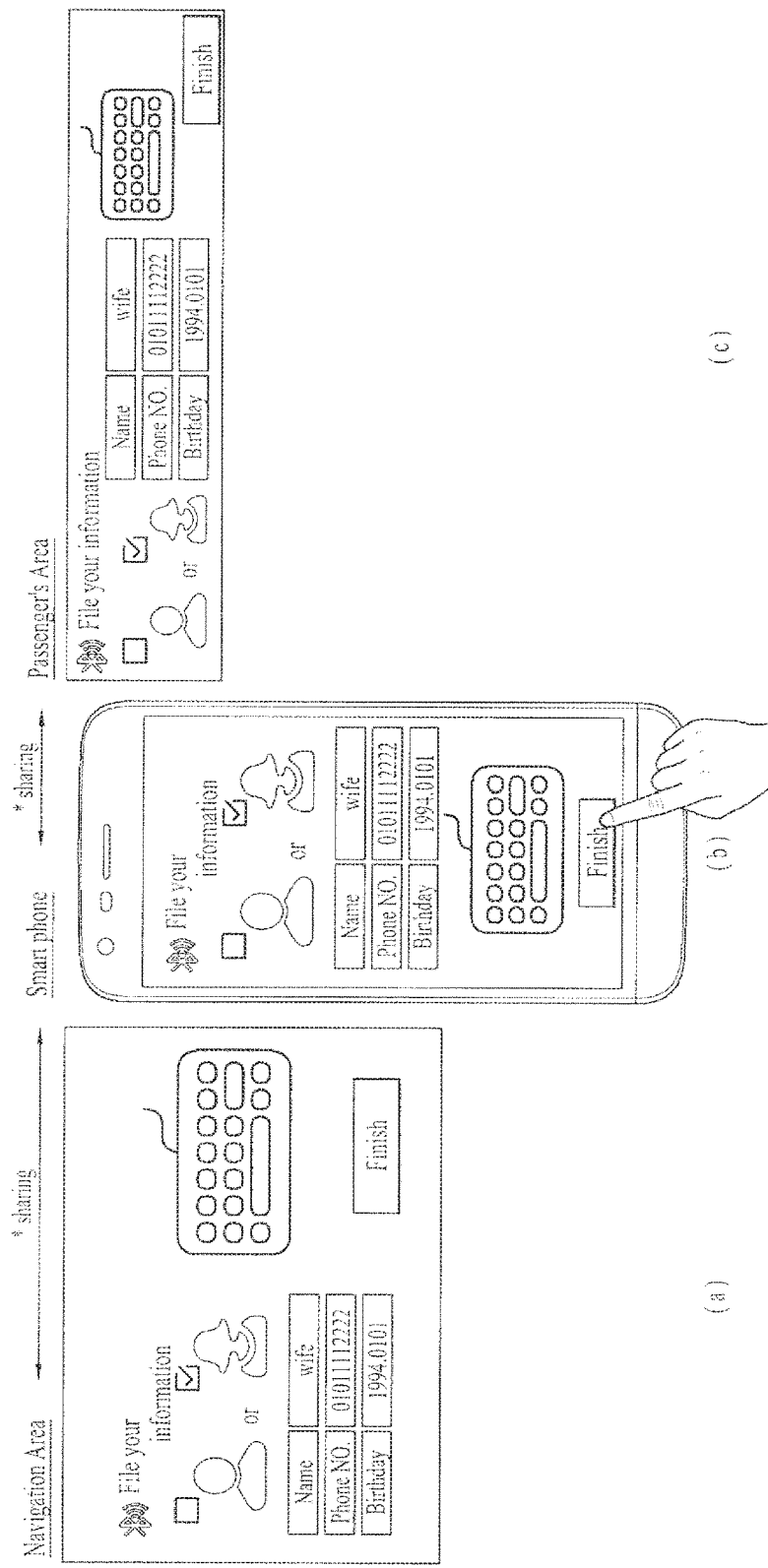
FIG. 16 and FIG. 17 are diagrams to describe a method of data communication between a vehicle and a mobile terminal according to the present invention.
Figure 17:

FIG. 16 and FIG. 17 are diagrams to describe a method of data communication between a vehicle and a mobile terminal according to the present invention.

FIG. 16(a) and FIG. 16(b) are diagrams showing details of a method for passenger registration on a display of a vehicle terminal. FIG. 16(c) shows the display of the vehicle terminal for an area that provides the registered passenger information according to FIG. 16(a) and FIG. 16(b).

A method of registering a passenger on a display of a vehicle terminal may be performed through an input of a direct touch to data provided to a display of a vehicle terminal [FIG. 16(a)] or a paired mobile terminal [FIG. 16(b)].

In FIG. 16, as input items in association with vehicle passenger registration, a passenger name/nickname, a contact, and a birthday are shown for example. Yet, the present invention is non-limited by the input items shown in FIG. 16 in association with the vehicle passenger registration. For instance, as described above, weight data sensed through a weight sensor for a corresponding passenger, other authority request data and the like may be included.

Besides, as shown in FIG. 17, when the vehicle passenger registration is performed, various informations on a preferred function, a preferred data and the like of the corresponding vehicle passenger can be inputted. The preferred data may include a music genre, a desired video data and the like, which are desired by the corresponding passenger on boarding. Regarding the preferred function, it may include the substance about a function (e.g., navigation function, air conditioner temperature control function, radio frequency setting function, seat forward/backward position, seat inclination, etc.) desired by the vehicle passenger among vehicle functions. Herein, although some of all of the preferred functions are not set separately, they may be automatically saved by being inputted/set for the vehicle according to a function use of the corresponding passenger and then exactly applied to a re-boarding of the corresponding passenger in the future.

Besides, if an item to be inputted provided [FIG. 16(a)] and an input to each item is received through a mobile terminal [FIG. 16(b)], it may be able to use a scheme of automatically inputting data of the corresponding item to a display of a vehicle terminal [FIG. 16(c)].

Figures 18, 19:
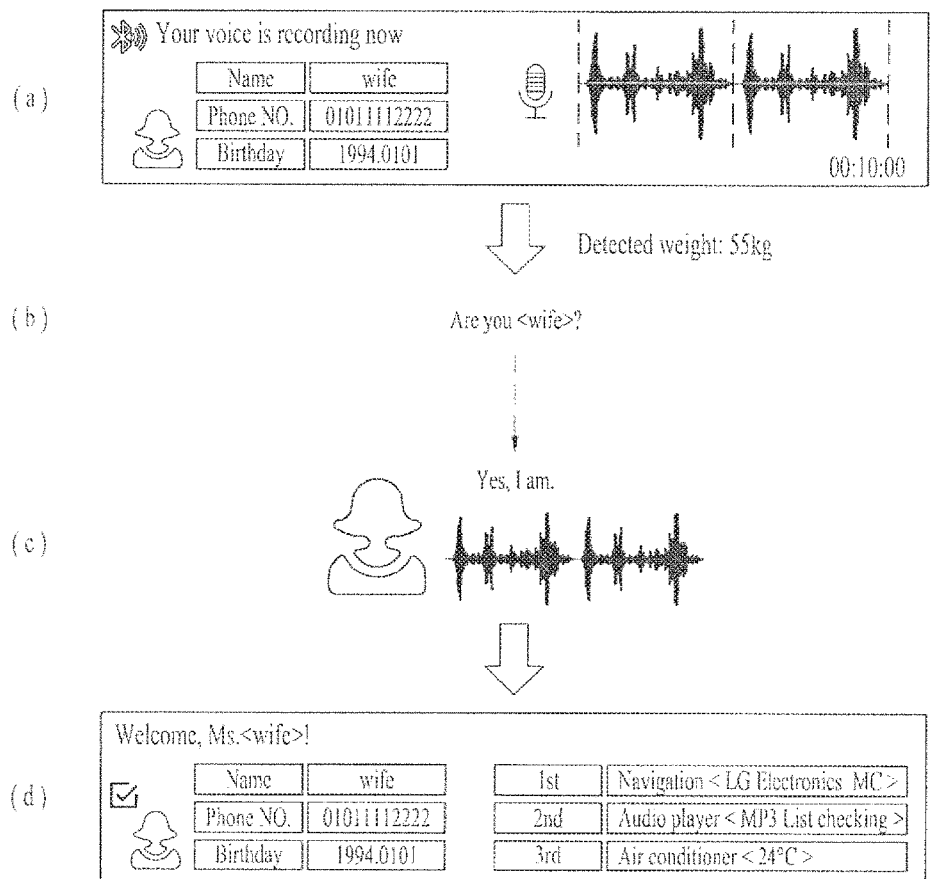
FIG. 18 and FIG. 19 are diagrams to describe a vehicle passenger recognizing method according to the present invention.

FIG. 18 and FIG. 19 are diagrams to describe a vehicle passenger recognizing method according to the present invention.

FIG. 18 shows a method of identifying a vehicle passenger through voice recognition of the corresponding vehicle passenger through a voice recognition sensor provided within a vehicle. FIG. 19 shows a method of if a passenger enters a vehicle, identifying a corresponding vehicle passenger by sending pre-registered unique data to a mobile terminal of the corresponding passenger.

Referring to FIG. 18(a), if a passenger enters a vehicle, the vehicle senses various data for it and collects the sensed data. For instance, if the passenger is seated on a seat, a location of the corresponding seat, weight data of the passenger, voice data and the like are sensed and collected.

Based on the collected data, the vehicle recognizes the corresponding passenger and identifies the recognized passenger. In order to check an identity of the identified passenger, as shown in FIG. 18(b), the vehicle determines the identity of the identified passenger through a display or speaker of a vehicle terminal or the like. If the identity of the corresponding passenger matches the identified passenger through a feedback of the passenger or the like [FIG. 18(c)], the vehicle configures passenger data area data for the identified passenger like FIG. 18(d) by reading the data of the corresponding passenger previously saved to the memory and then configures, provides and controls a display for a vehicle terminal by reflecting the configured passenger data area data.

Referring to FIG. 19, this method can be performed together with or separately from that shown in FIG. 18. Although a passenger has been registered as a vehicle passenger, since personal information of the passenger is unique, if such personal information is submitted wrongly, the personal information of the corresponding passenger may be possibly disclosed. Hence, a vehicle may create and use temporary data different from passenger's registration information.

For instance, if a mobile terminal number of a registered passenger is 010-1234-5678, a vehicle may provide the mobile terminal number of the registered passenger in a manner of changing the number into 019-9876-5432 or processing it into 010-1234-xxxx. Or, the mobile terminal number of the corresponding passenger may be blocked at all. Meanwhile, when the vehicle identifies the corresponding passenger through the mobile terminal, although a phone call is made to 010-1234-5678, as described above, the vehicle may provide the changed number 019-9876-5432 or the processed number 010-1234-xxxx to the display of the vehicle terminal. The vehicle may identity a corresponding user, i.e., a passenger in a manner of attempting the phone call and receiving a call acceptance of the corresponding user, or receiving the corresponding user's voice, finger data or the like after the call acceptance.

Meanwhile, although the above description takes the case of making a phone call using the temporary phone number or the partially blocked phone number as one example, text data through SMS, MMS, SNS and the like can be used as well.

Figure 20:
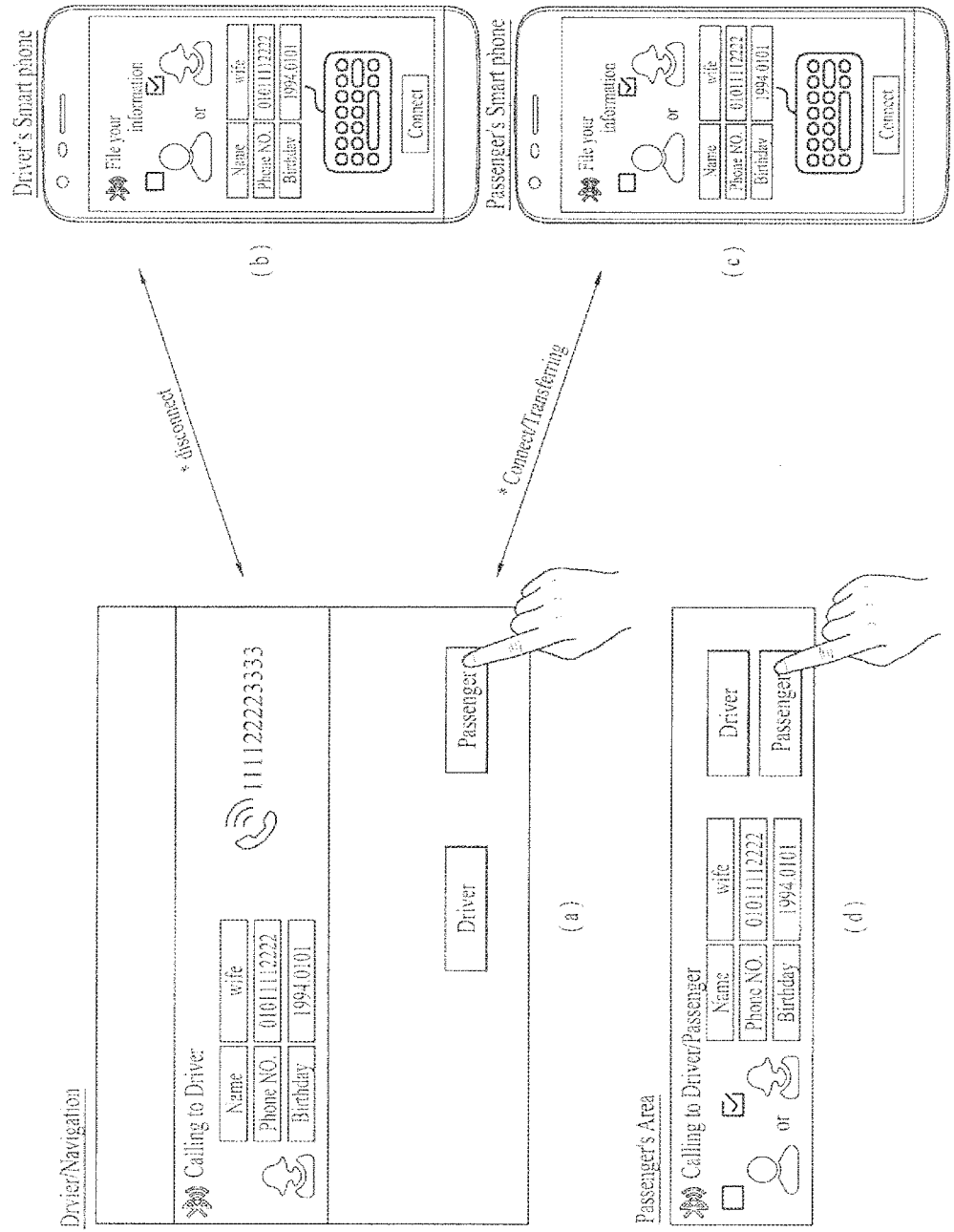
FIG. 20 is a diagram to describe a method of handling a case of an incoming call to a driver or passenger in the course of a vehicle operation according to the present invention.

FIG. 20 is a diagram to describe a method of handling a case of an incoming call to a driver or passenger in the course of a vehicle operation according to the present invention.

FIG. 20 shows a method of while a driver is driving a vehicle with at least one passenger on board, processing a case of an incoming call to the driver or the passenger from outside.

Herein, if an external person having made the phone call is included in in-vehicle passenger information for example, as shown in FIG. 20, details of the external person can be provided. Yet, otherwise, a phone number or the like may be provided only unlike FIG. 20, Referring to FIG. 20(a), if there is an incoming call to a mobile terminal of the driver from outside, a corresponding processing method is described as follows.

Generally, the driver may answer the incoming call through an earphone a Bluetooth device or the like in direct or according to pre-settings using the driver's mobile terminal shown in FIG. 20(b).

Yet, if the driver answers the incoming call in direct, the probability of accident danger rises in the course of driving the vehicle. Hence, information on a person making the incoming call is provided to a driver/operation assistive data area in the display of the vehicle terminal shown in FIG. 20(a) or a passenger data area in the display of the vehicle terminal shown in FIG. 20(d) and a calling subject can be also set to be selected.

Herein, if the driver or passenger selects not 'Driver' but 'Passenger', the vehicle may process the corresponding call to be received by the passenger based on the pre-registered information on the passenger. Regarding this, the vehicle may enable the call data to be received through the driver's mobile terminal or the passenger's mobile terminal in direct. In doing so, the vehicle may disconnect a call request to the driver's mobile terminal and enable the passenger's mobile terminal to be connected as shown in FIG. 20(c), in response to the selection. Herein, the 'disconnect/connect' is only representation on the corresponding mobile terminal and my not correspond to the general meaning of 'disconnect/connect'. Besides, this may be changed according to a used communication protocol.

Meanwhile, although a case of a call application like a phone is taken as one example in FIG. 20, it is able to process various applications installed on a mobile terminal of a driver or passenger or a vehicle using the above-mentioned method.

A display device provided to a vehicle capable of autonomous driving, i.e., the aforementioned auto driving is described in detail as follows.

One example of a vehicle supportive of auto driving according to the present invention includes sensors, a display including a screen formed on a front glass of the vehicle, and a controller controlling data sensed through at least one of the sensors to be displayed on the screen of the display based on an operation mode of the vehicle and vehicle passenger information.

And, a lens for obtaining side mirror data by being provided to a prescribed region of the vehicle may be further included. Herein, the lens may include a fisheye lens having a global shutter sensor applied thereto and a viewing angle may include 180 degrees. And, the controller may control image data obtained through the lens to be processed and displayed on a prescribed display area within the screen.

If the operation mode of the vehicle is an auto driving mode, the controller may control the data sensed through the sensors not to be outputted to the screen. If the operation mode of the vehicle is a manual mode, the controller may control the data sensed through the sensors and the data obtained through the lens to be displayed on a specific display area of the screen.

The controller may control at least one of transparency, resolution and brightness of the screen to be changed by referring to ambient environment data of the vehicle from the data collected through the sensors.

If the operation more of the vehicle is an auto driving mode and the number of passengers of the vehicle is plural based on the vehicle passenger information, the controller may control vehicle operation data sensed by the sensor to be displayed on a screen of a registered mobile terminal of the vehicle passenger.

The controller may collect gaze information of a driver of the vehicle through the sensor and control vehicle operation data collected through the sensor to be displayed on an area of the screen determined based on the collected gaze information.

If the operation mode of the vehicle is a manual mode, the controller may control vehicle operation data collected through the sensor to be displayed on a specific display area of the screen determined based on at least one of a speed of the operating vehicle, a current location of the operating vehicle, a current hour, and a distance to a destination of the operating vehicle.

Particularly, based on a factor (e.g., a vehicle operation mode, a vehicle operating region, a vehicle speed, a vehicle passenger, a vehicle operation time, etc.) or any combination of the factors, a method of configuring a display to enhance vehicle use convenience of a vehicle passenger according to the present invention is described in detail as follows.

Herein, according to the present invention, based on registration information of such a vehicle passenger, the setting registered substance may be appropriately changed according to various events possible to occur in the course of operation as well as an operation start. Moreover, although there is previously registered information of the passenger, the vehicle may enhance passenger's convenience in a manner of learning a use pattern of the passenger on board and then reflecting such substance in the course of operation or in case of a future boarding of the corresponding passenger.

Meanwhile, a location of each area in the display of the vehicle terminal shown in FIG. 7 may be switched by a driver or passenger, or data displayed on the corresponding area may be changed by the driver or passenger.

Besides, a vehicle may randomly change some of data of a passenger registered as a vehicle passenger. For instance, based on data of a vehicle internal environment or/and a vehicle external environment and the like, the vehicle may change some of pre-registered data. For instance, although a passenger has set an air conditioner temperature to 18° C. while making a registration in summer, if winter comes, it is necessary to change such a setting. Therefore, based on such information, it is able to apply an appropriate change corresponding to the setting substance. The vehicle internal environment or/and the vehicle external environment may include at least one of a boarding hour or a current hour, the number of passengers, a vehicle condition, a current weather, a current operation region, and the like as well as the season.

In the present specification, the substance described for a driver or passenger is applicable to a passenger or a driver all. And, a description with reference to one drawing may configure a new embodiment by being combined with another drawing.

The ongoing interest in the auto driving study is rising. In the present specification, it is intended to provide a different vehicle display configuration by categorizing a vehicle operation mode into an auto driving mode and a manual mode.

Moreover, regarding vehicle blind spot settlement, external environment effect minimization, fuel efficiency improvement, vehicle design limit and the like, it is recently attempted to physically remove a side mirror (or back mirror) from a vehicle. Yet, considering features of vehicle operation, data provided to a vehicle driver through the physical side mirror are very helpful to the vehicle operation. Hence, despite removing the side mirrors from the vehicle physically, it is advantageous for the safety of the vehicle operation if a substitute for such a mechanism as the side mirror is provided to the vehicle driver. Particularly, such data may be essential to the case of the manual mode in the vehicle operation mode. Yet, when the vehicle operation mode is the auto driving mode, the substitute may not be provided unless required. Generally, in auto driving mode, although an in-vehicle passenger is not aware of the data supposed to be provided through a side mirror, it may not cause problems to the vehicle operation. The reason for this is that it is enough for such data to be provided to a part configured to control the auto driving. Namely, it is unnecessary to provide such data to the passenger. Meanwhile, since a vehicle driver uses the auto driving mode so as not to bother to drive a vehicle, the vehicle driver may not monitor a display in the vehicle frequently. Yet, despite the auto driving mode, if there is a vehicle passenger's request, such information may be provided. To this end, a method of providing side mirror data in manual mode, which will be described later, may be employed.

Meanwhile, the following description is made by taking a vehicle, from which a side mirror is physically remoted, as one example. Hence, 'side mirror data' may generally indicate data corresponding to view image data provided to a vehicle passenger by a side mirror of a vehicle from which the side mirror is not removed physically. Yet, it is not necessary for such side mirror data to have an image form. And, the side mirror data may have various forms such as audio, video and the like.

A vehicle side mirror is described as follows.

FIG. 21 is a diagram of a side mirror installed vehicle related to the present invention.

FIG. 21(a) shows an inner view of a general vehicle having side mirrors. Particularly, side mirrors 2110 and 2120 are provided to left and right sides of the vehicle, respectively. And, a room mirror (not shown) is provided to an inner front side.

Meanwhile, FIG. 21(b) is a diagram showing a viewing angle of a side mirror 2130 of a general vehicle.

Figure 22:
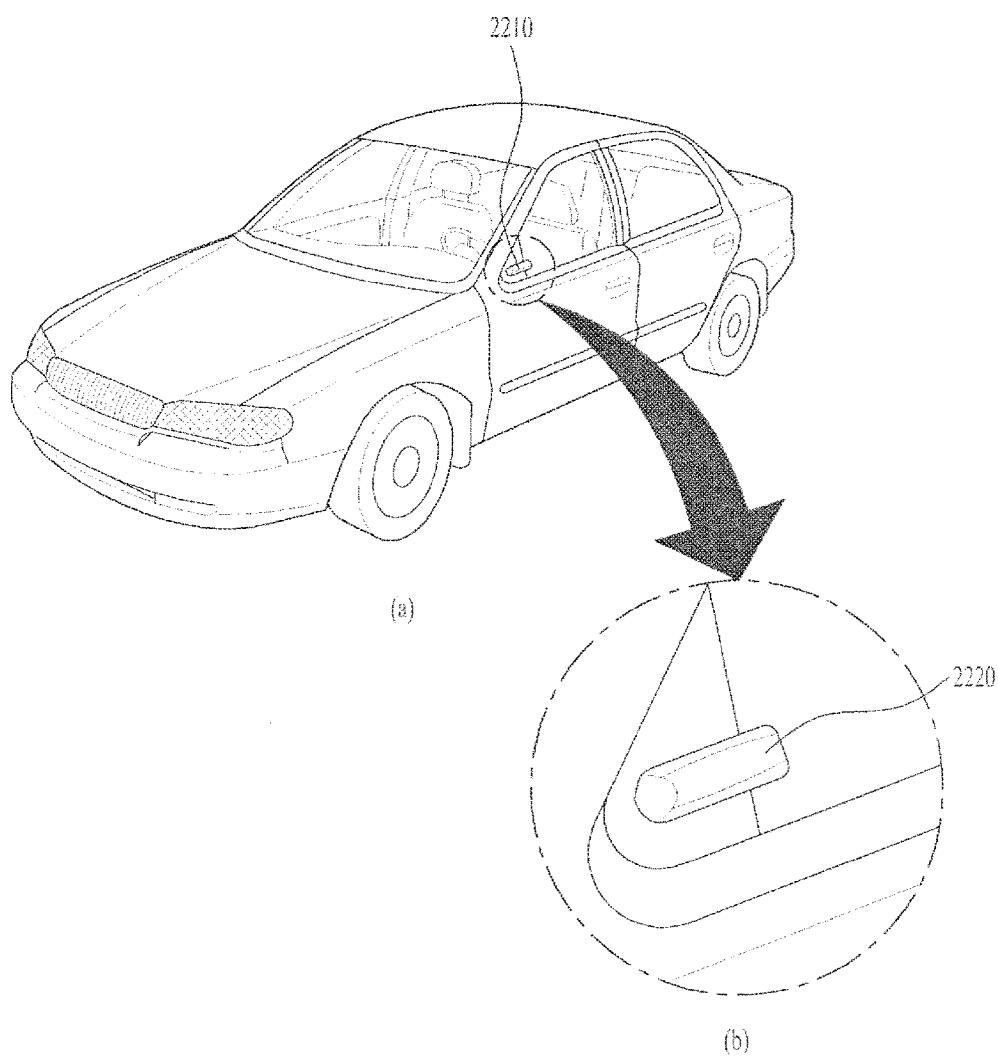
FIG. 22 is a diagram of a vehicle without a side mirror (i.e., a mirrorless vehicle) according to one embodiment of the present invention.
Figure 23:
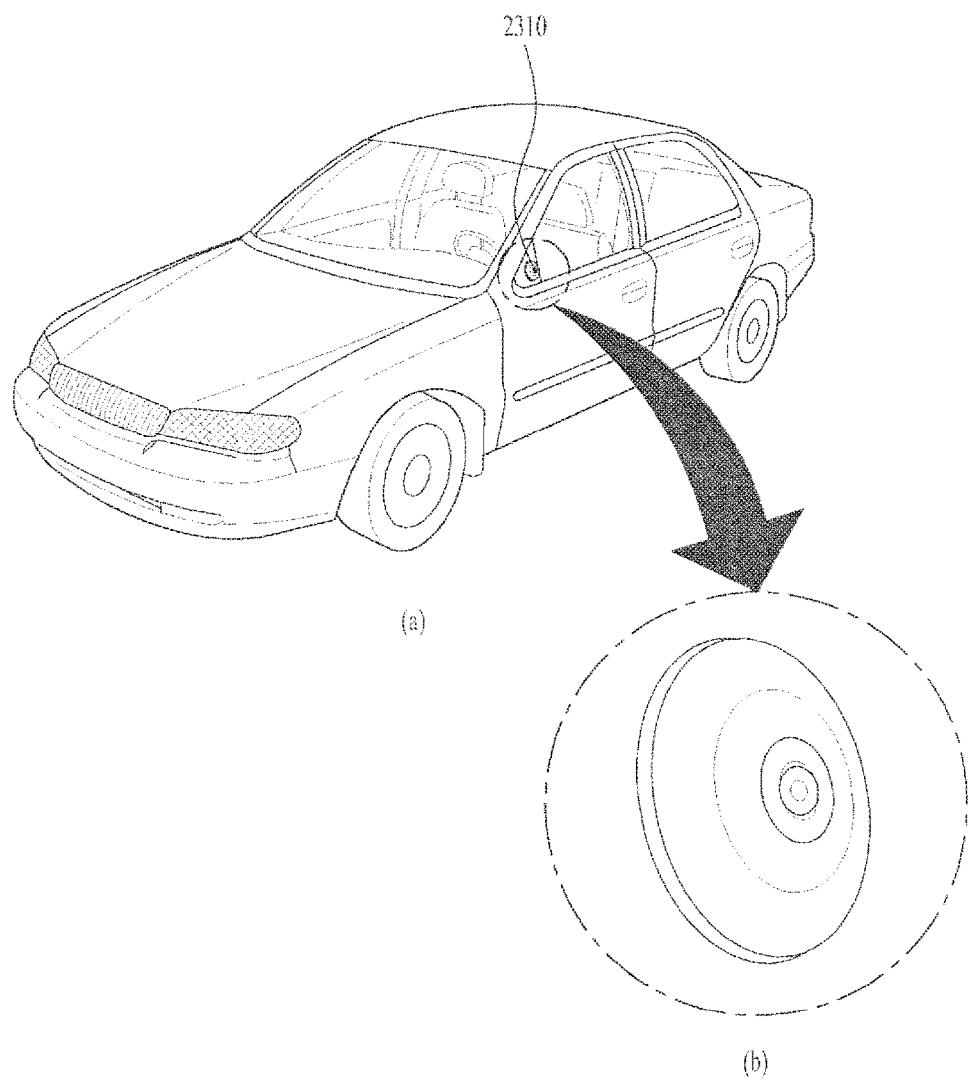
FIG. 23 is a diagram of a mirrorless vehicle according to another embodiment of the present invention.

FIG. 22 is a diagram of a vehicle without a side mirror (i.e., a mirrorless vehicle) according to one embodiment of the present invention. FIG. 23 is a diagram of a mirrorless vehicle according to another embodiment of the present invention.

FIG. 22(a) is a full diagram of a mirrorless vehicle, and FIG. 22(b) is an enlarged diagram of a part substituted for a side mirror of the vehicle shown in FIG. 22(a).

Particularly, in FIG. 22(b), a camera module 2220 is installed to be substituted for a conventional physical side mirror. Herein, a mirrorless vehicle, i.e., a vehicle without a side mirror may obtain side mirror data through the installed camera module 2220, image-process the obtained data, and then provide the image-processed data to a vehicle passenger. Meanwhile, as a related art vehicle employs a mirror for a vehicle passenger, it may provide each passenger with different information, be considerably affected by weather or ambient environment, and be impossible to provide other data such as audio and the like. On the contrary, according to the present invention, the mirrorless vehicle can provide expectable and stationary view image data clearer than that of the related art by controlling the camera module and also provide data (e.g., audio, etc.) that may possibly affect a vehicle operation. Moreover, through various functions (e.g., resolution, brightness, etc.) of the camera module 2220 installed in the mirrorless vehicle, a more clearer view image of a wide viewing angle is provided despite ambient environment, brightness and the like, whereby stability and safety of a vehicle operation can be enhanced.

Meanwhile, a shape, exterior and configuration of the mirrorless vehicle or the mirrorless vehicle part 2210 corresponding to the conventional side mirror represent one embodiment only, by which the present invention is non-limited. Moreover, the present invention uses the camera module 2220 as a substitute for a side mirror, by which the present invention is non-limited.

For instance, according to another embodiment of the present invention, a fisheye lens 2310 may be employed for example.

The mirrorless vehicle shown in FIG. 22(a) has the camera module 2220 installed instead of the side mirror. Although the camera module 2220 differs from the side mirror in size or exterior, it is exemplarily designed to face a rear direction in a manner similar to that of the related art side mirror in order to obtain side mirror data such as a view image and the like.

On the other hand, since a vehicle shown in FIG. 23(a) has a fisheye lens 2310 at a location of a side mirror, its exterior is different from that of the vehicle shown in FIG. 22 (a). Meanwhile, referring to FIG. 23(b), since the installed fisheye lens 2310 employs a lens having a viewing angle of 180°, it is not necessary for the fisheye lens 2310 to be implemented in a manner of requiring a space for a lens and having a shape facing a rear direction. Therefore, the purpose of the mirrorless vehicle and the design convenience can be further enhanced.

Moreover, referring to FIG. 23, in the mirrorless vehicle 2310 including the fisheye lens 2310 having the viewing angle of 180°, the viewing angle can be further increased than that of the related art or the camera module 2220 shown in FIG. 22, thereby preventing difficulty in vehicle operation, vehicle accident and the like due to an existence of a blind spot.

The fisheye lens 2310 may be employed as a substitute for a rear camera of a vehicle as well as for a side mirror. In this case, the fisheye lens 2310 may randomly adjust a convex/concave/wide mirror effect, a video display range and the like through a filter after obtaining a rear video.

Meanwhile, the fisheye lens 2310 may employ a global shutter sensor that minimizes image distortion in case of high-speed photography.

Figure 24:
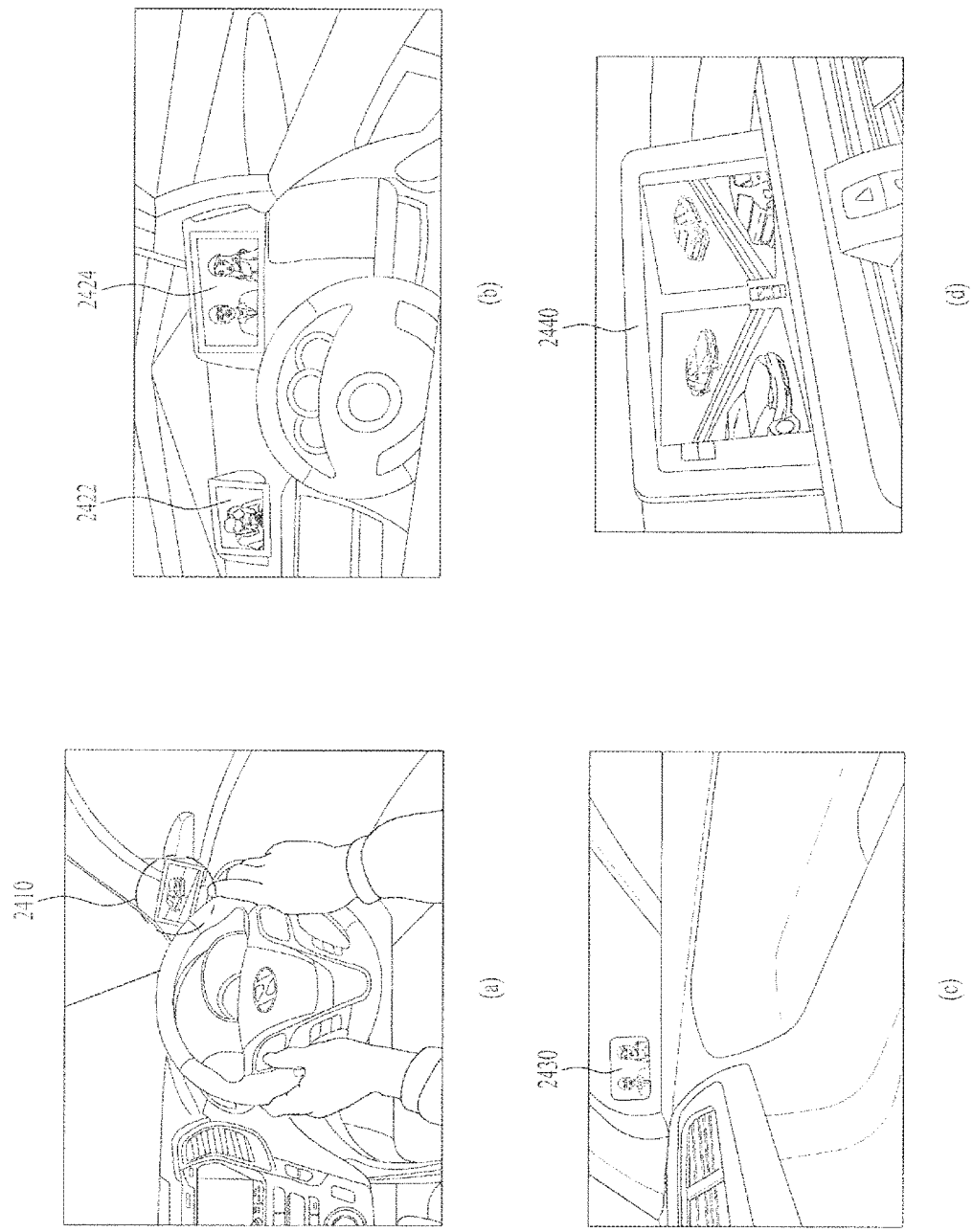
FIG. 24 is a diagram to describe a method of providing side mirror data of a mirrorless vehicle according to one embodiment of the present invention.

FIG. 24 is a diagram to describe a method of providing side mirror data of a mirrorless vehicle according to one embodiment of the present invention. FIG. 25 is a diagram to describe a method of providing side mirror data of a mirrorless vehicle according to another embodiment of the present invention.

Referring to FIGS. 24(a) to 24(d), side mirror data is provided through a display device provided within a vehicle in advance.

Particularly, in FIG. 24, a separate display device or display devices 2410, 2422, 2424, 2430 and 2440 within the vehicle are included, thereby providing side mirror data obtained through the camera module 2220 or the fisheye lens 2310.

Yet, in case of using the separate display device shown in FIG. 24, a cost problem, a power problem, compatibility with the camera module 2220 or the fisheye lens 2310 according to the mirrorless, and limit of internal vehicle interior may be caused.

On the other hand, in FIG. 25, as a display device implemented on a front glass of a vehicle is utilized, side mirror data 2512 obtained through a camera module or a fisheye lens can be provided while a front view of the vehicle is watched intactly and transparently. An image 2514 shown in FIG. 25(a) is an enlarged image of an image 2512 for understanding. In FIG. 25(b), the vehicle provides side mirror data to locations near the previous side mirrors 2522 and 2524, thereby preventing confusion attributed to user's previous driving habit.

Referring to FIG. 25(a) and FIG. 25(b), since the mirrorless vehicle can process (or individualize) or change the data provided through the camera module or the fisheye lens (hereinafter fisheye lens) according to a vehicle passenger, thereby providing a differentiated service according to the vehicle passenger.

For instance, in FIG. 24, despite a mirrorless vehicle, a passenger is not allowed to randomly adjust or change a location of a display device providing side mirror data physically according to a vehicle passenger. Yet, in FIG. 25(a) or FIG. 25(b), a location of a display can be randomly changed within a size of a display device implemented on a front glass of a mirrorless vehicle at least and resolution adjustment, size change, side mirror data displaying method and the like can be controlled in various ways. Therefore, an optimized service according to a vehicle passenger can be provided.

A data display configuration according to a vehicle operation mode in a mirrorless vehicle is described as follows.

Herein, the vehicle operation mode means an auto driving mode and a manual mode in consideration of auto driving, of which research and development are being actively performed. The auto driving mode exactly means a case that a module or configuration (hereinafter named 'an auto driving controller') for controlling an operation in a vehicle drives the vehicle despite absence of vehicle driver's operation manipulation. The auto driving controller may be described by being named a controller and its meaning may include the same entity or configuration of a controller within a general vehicle. Herein, the auto driving mode may include a case of assisting a vehicle driver's operation manipulation by being partially involved in the vehicle operation. Hence, the manual mode means a case that a vehicle operation is performed by a vehicle driver's manual manipulation only. Although the above description is made on the assumption of the auto driving mode, if the auto driving controller's involvement in the vehicle operation is insignificant or performed in a specific event only and most of the vehicle operation depends on a vehicle driver's manual manipulation, the manual mode may be taken into consideration despite the above description. In this case, it is able to make determination by referring to data preset in software related to a vehicle operation mode determination in a controller of in a vehicle.

Figure 26:
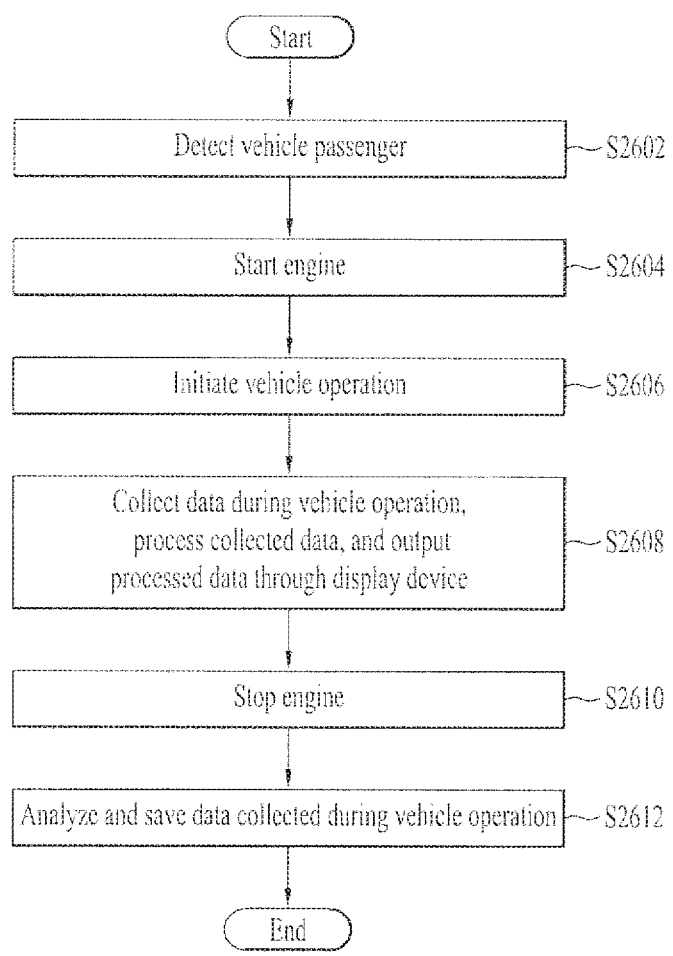
FIG. 26 is a diagram to describe a method of controlling a display device in a vehicle according to one embodiment of the present invention.

FIG. 26 is a diagram to describe a method of controlling a display device in a vehicle according to one embodiment of the present invention.

If a passenger is detected from a vehicle ambience [S2602], the controller turns on an engine start of a vehicle [S2604]. The step S2602 may be omitted. Or, the step S2604 is not performed despite the steps S2602. Instead, a passenger may board the vehicle and then directly perform the step S2604. In the steps S2602, the vehicle ambience may have the same meaning of a sensible range according to a sensor installed in the vehicle. Meanwhile, in the steps S2602, although a vehicle passenger is detected from the vehicle ambience, since the detected vehicle passenger may not be a vehicle owner or a passenger with righteous authority. Hence, after the authority of the detected vehicle passenger has been determined in various ways, only if the detected vehicle passenger is determined as a passenger having the righteous authority as a result of the determination, the step S2604 can be automatically executed.

If the engine start is turned on in the step S2604, the controller controls a sensor to be turned on to collect vehicle operation related data of the vehicle, the vehicle passenger the vehicle ambience environment and the like since the engine start. The controller collects data sensed by at least one turned-on sensor.

Thereafter, the controller initiates a vehicle operation according to a passenger's intention [S2606].

Once the vehicle operation is initiated, the controller collects vehicle operation data through the sensor, the fisheye lens and the like. The controller processes the collected data and then outputs the processed data through a display device in the vehicle [S2608].

Thereafter, if the vehicle operation is ended, i.e., the engine start of the vehicle is turned off [S2610], the controller ends the data output in the step S2608.

In doing so, the controller may self-analyze the vehicle operation data right before the vehicle operation end or analyze the corresponding data with a previous or previously stored vehicle operation data and then save and control it [S2612]. Yet, the step S2612 may or may not be implemented depending on a system. Yet, by analyzing and saving the operation data through this step, a passenger of a vehicle can be learned and a personalized service or data for a vehicle operation can be provided through such learning.

Figure 27:
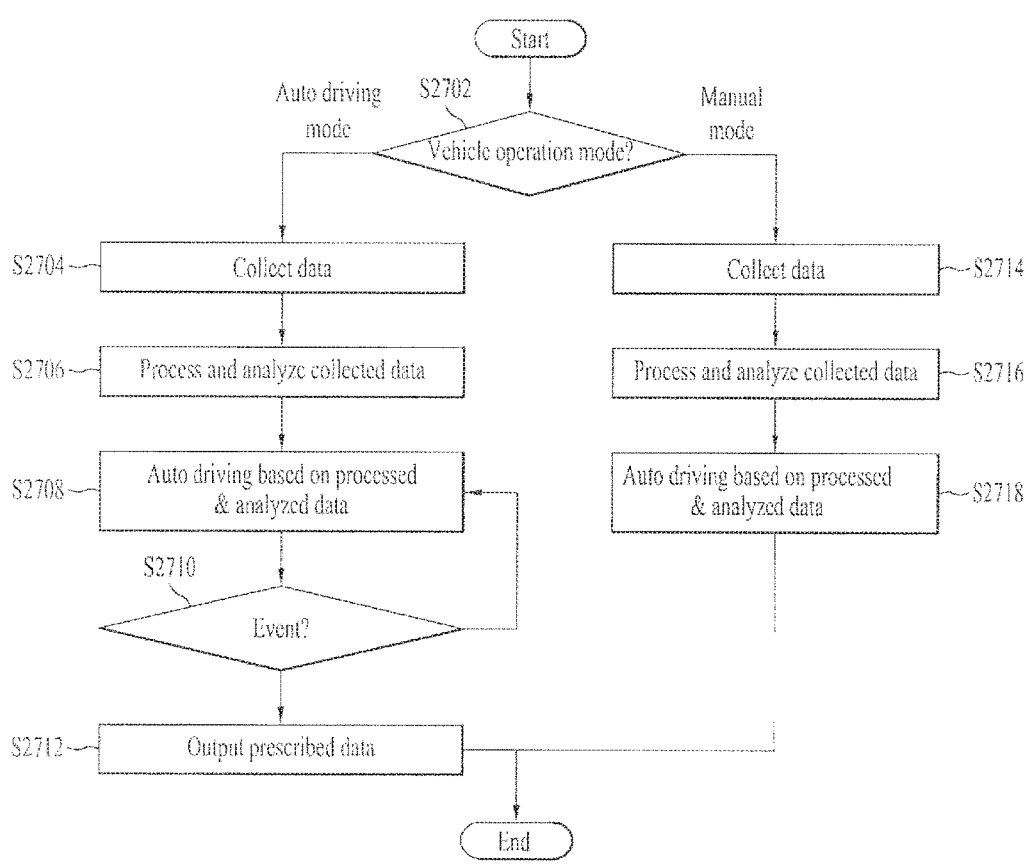
FIG. 27 is a flowchart to show a method of controlling a display device in a vehicle in vehicle operation mode according to one embodiment of the present invention.

FIG. 27 is a flowchart to show a method of controlling a display device in a vehicle in vehicle operation mode according to one embodiment of the present invention.

Herein, FIG. 27 may be details of a portion of FIG. 26. For instance, for clarity, a method of controlling a display in a vehicle according to a vehicle operation mode is omitted from FIG. 26. Hence, FIG. 27 may correspond to details of the steps S2604, S2606 and S2608 in FIG. 26.

If the engine start is turned on in the step S2604 of FIG. 26, the vehicle enters an operational state. In this case, the vehicle operates according to a vehicle operation mode. Hence, if the vehicle operation mode is determined based on an the preset substance in the vehicle, a user's selection or the like at one timing of 'before the vehicle operation start', 'the same time of the vehicle operation start' and 'after the vehicle operation start' at least, the controller controls the vehicle to operate correspondingly.

So to speak, if the engine start is turned on, the controller determines the vehicle operation mode [S2702].

As a result of the determination, if the vehicle operation mode is determined as an auto driving mode, the controller collects vehicle operation data [S2704]. In doing so, the collected data may be equal to or different from data collected in case of a manual mode of the vehicle operation mode in the following step S2714 for example.

The controller processes the collected vehicle operation data and analyzes the processed vehicle operation data [S2706]. Thereafter, based on the analyzed vehicle operation data, the controller initiates the auto driving or maintains the operation in case of the existing auto driving [S2708].

In the course of the vehicle operation in the auto driving mode in the steps S2708, the controller checks whether a vehicle event occurs periodically or aperiodically [S2710]. Herein, the vehicle event may include any case that may possibly occur in association with a vehicle in operation or an auto driving mode.

As a result of the check, if the vehicle event occurs, the controller outputs data related to the vehicle event, the auto driving mode and the like through a display device within the vehicle [S2712].

Thereafter, the controller determines a vehicle operation control according to the substance or program previously set according to various situations such as a vehicle passenger's selection, an event and the like and is then able to follow the determined control.

Subsequently, as a result of the vehicle operation mode determination in the step S2702, if the manual mode is determined, the controller collects operation data [S2714]. In this case, the collected operation data may be equal to or different from operation data collected in the auto driving mode in the step S2704. Yet, although the operation data collected in both modes are equal to each other, the operation data providing methods may differ from each other according to the modes.

The controller processes and analyzes the manual mode operation data collected in the step S2714 [S2716]. Thereafter, the controller checks whether an event occurs in the course of the vehicle operation. As a result, if a prescribed event occurs, the controller provides prescribed data to the display device in the vehicle based on analysis data corresponding to the occurring event [S2718]. Meanwhile, the event may be defined in various ways. For instance, assuming the event as a case such as a navigation request, a side mirror data, a rear direction data, a lane change, a call reception, a vehicle passenger's request or the like, the control can continue to provide data to a vehicle passenger through the display device based on other analysis data.

As described above, if an operation mode of a vehicle is an auto driving mode, unless a specific event occurs, it may be unnecessary to output data through a display device of the vehicle in general. It is enough for the controller to use the collected, processed and analyzed data for the auto driving only. If a vehicle passenger contacts with such data each time, it may not match up with the purpose or intention of the auto driving. Like a case of a presence of a vehicle passenger's request, a preset event, an arrival at destination, or the like, only if the vehicle passenger needs to be provided with prescribed information or vehicle passenger's control and recognition are required, it is enough for the controller to provide information through the display device of the vehicle.

On the other hand, if the operation mode of the vehicle is the manual mode, the controller needs to utilize the collected, processed and analyzed data to assist the vehicle passenger's vehicle operation.

Regarding this, FIG. 28 is a table to describe a displaying method in manual mode of a vehicle operation mode according to one embodiment of the present invention, and FIG. 29 is a table to describe a displaying method in manual mode of a vehicle operation mode according to another embodiment of the present invention.

Herein, the following description is made with reference to FIG. 28 and FIG. 29 on the assumption that a vehicle operation mode is a manual mode for clarity, by which the present invention is non-limited. And, the following description may be applied to or referred to by a data display method of an auto driving mode.

FIG. 28 relates to a display device control method in a manual vehicle operation mode, i.e., a manual mode. For such a control, at least one of various vehicle operation related factors may be referred to.

FIG. 28 shows that the vehicle operation factors include a vehicle operation speed factor, a location factor of a currently operating vehicle, a time factor of a currently operating vehicle, and a distance factor to a destination of vehicle operation. Yet, the present invention is non-limited by the factors shown in FIG. 28.

Herein, each factor is shown as functioning as an individual factor for a controller to control a display device, by which the present invention is non-limited. By referring to a prescribed combination with one or more other factors exampled or referred to despite failing to be shown, it may be able to control a data display.

Moreover, for clarity, a display location or area control of data to be outputted through a display device according to the vehicle operation factors is taken as one example for the description with reference to FIG. 28 and FIG. 29, by which the present invention is non-limited.

First of all, the vehicle operation speed among the vehicle operation factors is described.

Referring to FIG. 28(*a*), a vehicle operation speed factor among vehicle operation factors determines a prescribed display area of a display device with reference to a predetermined speed and a current speed. For clarity, in FIG. 28(*a*), 40 km/h is exampled, by which the present invention is non-limited.

For instance, if a current vehicle operation speed increases fast, a driver should continue to watch a front direction to prevent a vehicle operation accident. If a normal vehicle operation speed is equal to or higher than the predetermined speed, it is necessary for the driver to further pay attention to an ambient environment and the like. In this case, data is displayed on the bottom of a display device. If the normal vehicle operation speed is lower than the predetermined speed, data is displayed on the top or/and bottom of the display device.

If a current vehicle operation speed keeps being changed rather than being stationary, the controller may randomly adjust an output area of data displayed on the display device, a size of outputted data and the like according to a situation [not shown]. For instance, a current vehicle operation speed is assumed as increased to 100 km/h from 80 km/h in several minutes and then exceeding 120 km/h after several seconds. In this case, the controller may recognize that the vehicle operation speed keeps increasing. Generally, if a vehicle speed increase, accident risk may increase and fuel efficiency may be degraded. Generally, if a vehicle speed increases, a front preview distance elongates. Hence, it may be preferable that data is displayed on the near-top area rather than a display bottom. Hence, in order to inform a vehicle passenger of such a fact according to a vehicle operation speed, the controller randomly adjusts a current data displayed area. If the vehicle speed exceeds a predetermined range, the controller may randomly adjust at least one of displayed data color, data size, data distinction, data display area and full display device resolution. As described above, other data related to the vehicle speed may be provided in a manner of being randomly adjusted. Meanwhile, in the case reverse to the above-exampled case of an increasing speed, the random adjustment may be performed in a reverse manner.

A current location or place of a vehicle among vehicle operation factors is described as follows.

Referring to FIG. 28(*b*), if a vehicle is currently stopped or parked, the controller may collect data for a current location and determine whether to display vehicle operation data on a top or bottom area of a display device based on the collected vehicle location data. Or, unlike the drawing, the controller analyzes the collected vehicle location data. if a corresponding result indicates a familiar location, the controller may control vehicle operation data not to be displayed at all. This may apply to other vehicle operation factors in a similar manner.

As a result of the current vehicle location data analysis, if a currently located place of the vehicle is a familiar place, the controller may provide the vehicle operation data to the top of the display device only. On the contrary, as a result of the current vehicle location data analysis, if a currently located place of the vehicle is not a familiar place, the controller may provide the vehicle operation data to the top and bottom of the display device only. This is because if the current vehicle location is not a familiar place, more data should be provided in comparison with the familiar case.

Meanwhile, herein, whether the current vehicle location is a familiar place or an unfamiliar place can be determined by the controller in a manner of checking whether the number of visits to the corresponding place through a vehicle operation record is over a predetermined count. Generally, in case of visiting a place for the first time, a vehicle operation speed may become lower than a usual vehicle operation speed, it may takes a time longer than an estimated time, or a corresponding route may get complicated due to deviation from an optimal route. Therefore, based on such data from the vehicle operation record, it is able to determine whether a vehicle passenger is familiar with the corresponding place. Or/and, based on a user's input or other data, the controller may determine whether the vehicle passenger is familiar with the corresponding place. For instance, if a user inputs not an address but an address name (e.g., company, home, client, etc.) while using a navigation, it can be inferred that such a place is a place already familiar with the vehicle passenger. In this case, based on such data, after the corresponding place has been visited at least once, the controller may determine the corresponding place as a familiar place. Besides, based on various data such as a vehicle passenger's behavior, an inter-vehicle passenger conversation, a vehicle passenger's telephone conversation content and the like, a presence or non-presence of familiarity with the corresponding place may be determined.

A current vehicle operation time among the vehicle operation factors is described as follows.

Referring to FIG. 28(*c*), the controller may determine a data display area on a display device according to a current vehicle operation time. If the vehicle operation time is a weekday, since a determined route is repeated frequently in general, data is mainly displayed on the bottom of the display device. On the other hand, if the vehicle operation time is a weekend, since a route may be different from that of the weekday, data may be displayed on the top and bottom of the display device to provide relatively more information.

Meanwhile, as the vehicle operation factor, whether a current vehicle operation time is a weekday or weekend is exampled only. Alternatively, a data display area can be differentiated by taking morning, afternoon, evening or current hour as a reference for a current vehicle operation time. For instance, if a current vehicle operation time is morning or evening, a vehicle can be regarded as operating on a determined traveling route. Yet, since the vehicle may have a relatively undetermined traveling route in the afternoon, a data display area may be controlled differently based on such time information.

Finally, referring to FIG. 28(*d*), the controller may determine a data display area of a display device according to a travelling distance of a vehicle. For instance, if a vehicle traveling distance is a long distance, data is provided to the bottom of the display device only. If the vehicle travelling distance is a short distance, data may be provided to the top and bottom of the display device. Generally, if a travelling distance of a vehicle increases, fatigue of a vehicle passenger will increase as well. Relatively necessary data may be preferably provided instead of further increasing the vehicle passenger's fatigue by providing lots of data.

FIG. 29 shows detailed settings related to the vehicle operation factors described with reference to FIG. 28, and more particularly, to the vehicle operation time.

Referring to FIG. 29, the controller categorizes days into weekdays and weekends. The controller categorizes the weekdays into a holiday and a non-holiday. Such categorization can be recognized based on vehicle operation time, vehicle passenger's schedule information, and other informations.

First of all, while a vehicle is operating not on a holiday but on a weekday, if the vehicle is determined as operating within a main traffic section based on vehicle record data, the controller may recognize that it is familiar with the lay of the land like a travelling from home to a work place for example. In this case, the controller may provide vehicle operation information. Instead, the controller may provide information on a vehicle passenger through a display device rather than the vehicle operation information unless data should be urgently provided. For instance, if an operation route of the vehicle is recognized as travelling to a work place, the controller may control today's schedule information or information on a current hour based next schedule to be provided.

On the other hand, while the vehicle is operating not on a holiday but on a weekday, if the vehicle is determined as operating out of the main traffic section based on the vehicle record data, the controller may recognize it as a business trip and control vehicle operation information to be intensively provided unless an urgent schedule. For instance, by making a determination with reference to current hour, destination information, current travelling route information, road situation and the like, the controller may recommend a detour in comparison with a vehicle passenger's schedule.

Meanwhile, if the vehicle is operation on a weekday that is a holiday, the controller may control the display device in a manner similar to that for a weekday.

On a weekend, if a current travelling route of the vehicle is an operation in a weekend main traffic section, the controller may control the display device to provide fuel consumption to a destination, time required, in-section recommended gas station information display, information on destination (e.g., item sale, etc.) and the like.

On a weekend, if a current traveling route of the vehicle is out of the weekend main traffic section, the controller may control the display device to provide famous tourist sites near destination, famous restaurants, famous restaurant information, zoom-in display of details on information selection, destination auto-setting, recommendation information mainly with restaurants and the like according to hours, recommendation fluctuation mainly with landmarks, restaurant recommendation according to estimated time of arrival at famous restaurant, and the like.

Figure 30:
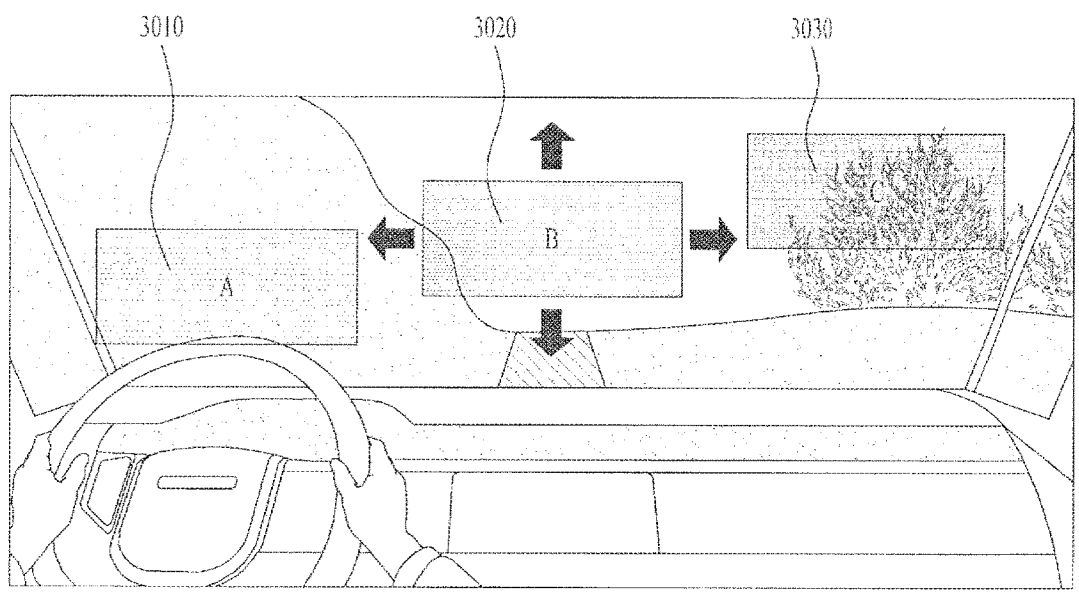
FIG. 30 is a diagram to describe a data display area of a display device and a corresponding method according to one embodiment of the present invention.

FIG. 30 is a diagram to describe a data display area of a display device and a corresponding method according to one embodiment of the present invention. For clarity, the following description is made on a case that a vehicle driver seat is formed on a left side in a vehicle, by which the present invention is non-limited.

In FIG. 30, as described above, a display device is implemented to correspond to a vehicle's front glass. For clarity, a display area in the display device is described in a manner that the display area is named first to third areas with reference to a horizontal axis and that each of the areas is named top, middle end and bottom with reference to a vertical axis. Herein, the first area indicates a front area of a vehicle driver, the third area indicates a front area of an assistant seat of the vehicle driver, i.e., a front passenger seat, and the second area indicates a space between the first and third areas. In this case, each of the areas may be implemented in equal or different size. And, such a size can be randomly changed in the course of vehicle operation. Meanwhile, each of the display areas may mean a virtual display area in case of an integrated display device. If the display device is implemented by combining a plurality of display configurations, each of the display areas may mean a physical display area. The present invention is non-limited by the display area definitions and descriptions, and the display area meanings may be construed differently with respect to the vehicle operation. Meanwhile, the display device divides and provides the display area according to information appropriately, thereby enhancing its effect.

Referring to FIG. 30, a display area A 3010 is provided a bottom area of a first area, a display area B 3020 is provided a middle area of a second area, and a display area C 3030 is provided a top area of a third area. This is one example to describe a display area, and data may be implemented in form different from that shown in the drawing despite a specific area is specified.

Referring to FIG. 30, a controller may variously control distinction, resolution, transparency and the like of a display area outputted according to the display area. For instance, referring to FIG. 30, the display area A 3010 has the highest transparency. And, the transparency gets lowered toward the display area C 3030. This is to provide vehicle operation convenience and prevent accident, by raising the transparency, as the display area A 3010 is formed in front of a vehicle driver. On the other hand, the display area C 3030 has the lowest transparency. This is because the display area C 3030 has the lowest relation to vehicle operation or operation safety among the front display areas. So to speak, since the display area C 3030 is not frequently watched by the vehicle driver in the course of the vehicle operation unless a case of watching a right side mirror of a vehicle with side mirrors, it is a display area for a vehicle fellow passenger, i.e., another passenger except the vehicle driver.

Meanwhile, in order to output data to each display area, a display window may be provided. Such a display window can be shifted to any area in a display area, and a size of each display window can be randomly changed irrespective of a boundary between the areas.

FIG. 31 is a diagram to describe a method of controlling a display device to cope with an ambient environment according to one embodiment of the present invention.

Referring to FIG. 31(*a*), a controller may differently control a display method of a display device according to a tint of a front glass window having a vehicle display device 3110 implemented thereon, a time, a place and the like.

For instance, assuming that a vehicle front window shown in FIG. 31(*a*) is tinted, the window is affected irrespective of transparency and the like of the display device 3110 implemented on the vehicle's front glass. Hence, as shown in FIG. 31(*b*), the controller controls the transparency of the display windows 3120 and 3130, which are provided through the respective display areas of the display device 3110, to secure vehicle passenger's vehicle operation safety depute the tint or ambient environment.

Or, in that case shown in FIG. 31, the controller may utilize the display device as follows.

Figure 32:
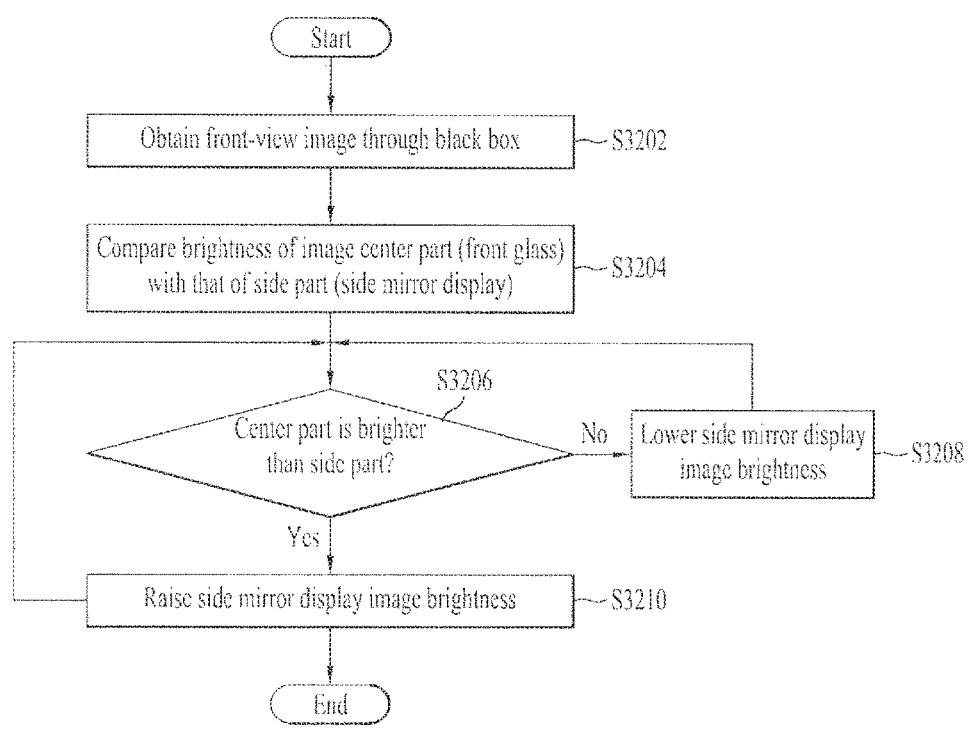
FIG. 32 is a flowchart to describe a method of controlling a display device to cope with an ambient environment according to one embodiment of the present invention.

FIG. 32 is a flowchart to describe a method of controlling a display device to cope with an ambient environment according to one embodiment of the present invention.

Herein, assume that a vehicle is equipped with a hardware configuration (e.g., black box) capable of capturing out-of-vehicle images (e.g., front view image of vehicle, rear view image of vehicle, side view images of vehicle, etc.). The black box may be substituted or combined with a sensor unit of the present invention.

Referring to FIG. 31 and FIG. 32, a controller obtains data for a vehicle front view image from a black box of a vehicle [S3202].

The controller compares brightness of a vehicle's front glass with that of a vehicle's side glass and determines whether the brightness of the vehicle's front glass is higher than that of the vehicle's side glass [S3204, S3206].

As a result of the determination of the step S3206, if the brightness of the vehicle's front glass is not higher than that of the vehicle's side glass, the controller lowers brightness of side mirror data currently provided to the vehicle's front glass [S3208].

On the contrary, as a result of the determination of the step S3206, if the brightness of the vehicle's front glass is higher than that of the vehicle's side glass, the controller raises the brightness of the side mirror data currently provided to the vehicle's front glass [S3210].

Meanwhile, if a vehicle operation hour is a night time, the vehicle enters a tunnel, or brightness according to a vehicle's tinted front glass is low, the controller may implement an external view image obtained from the black box as if the vehicle operation hour is a day time, the vehicle exits the tunnel, or the vehicle's front glass is not tinted, through the display device implemented on the vehicle's front glass [not shown in FIG. 32]. In this case, the controller processes the external view image obtained from the black box so as to enable a vehicle driver to have a view similar to a direct view in daytime as far as a vehicle driver's driving is not interrupted. In doing so, additional vehicle operation data, side mirror data and room mirror data can be image-processed unlike the related art for vehicle driver's identification convenience.

Figure 33:
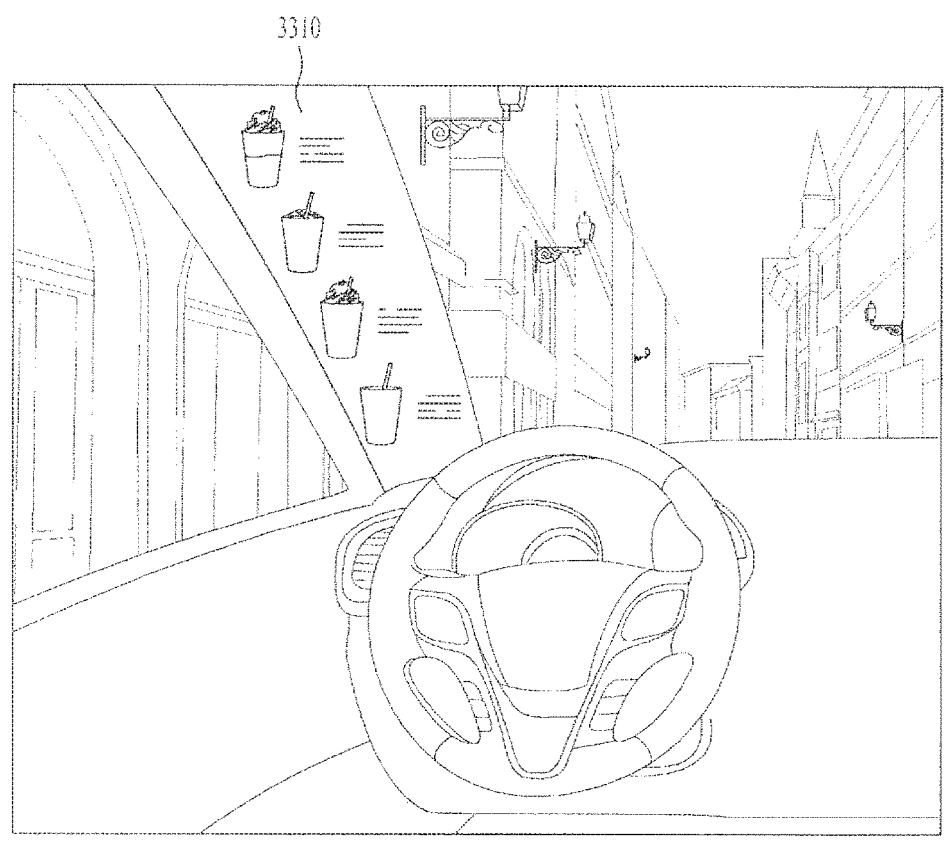
FIG. 33 is a diagram to describe a method of controlling a display device to cope with a current vehicle location according to one embodiment of the present invention.

FIG. 33 is a diagram to describe a method of controlling a display device to cope with a current vehicle location according to one embodiment of the present invention.

For clarity, the following description is made by taking a case that a vehicle enters a drive-through zone as one example.

If detecting that a vehicle in operation has entered a drive-through zone, a controller announces the entry into the drive-through zone through a GPS sensor, short-range communication between a vehicle body and a business establishment and the like and then receives drive-through information from the business establishment. The controller processes the received drive-through information, thereby providing a vehicle display device with drive-through menu, each menu price, payment information, and the like.

In doing so, as shown in FIG. 33, the controller provides the processed drive-through information 3310 to a specific area to facilitate the communication between the vehicle in operation and the business establishment in the drive-through zone.

The controller may send a signal according to an in-vehicle passenger's selection of the drive-through menu to the drive-through business establishment and make a payment automatically using an in-vehicle 'hi-pass' payment system and the like.

Referring to FIG. 33, although the controller provides the drive-through menu on a left surface of a display device in the vehicle in a straight-line form in a vertical direction, by which the present invention is non-limited. For instance, the controller may provide the drive-through menu not on the left surface but on a full surface of the display device according to a quantity of the drive-through menu in a manner of spreading the menu. In this case, for passenger's selection convenience, a UI is configured and controlled in various ways based on zoom-in, zoom-out, gesture, voice and the like.

FIG. 34 is a diagram to describe a method of controlling a display device to cope with vehicle driver's sight according to one embodiment of the present invention.

In spite that each vehicle driver has different personality, if a controller controls a vehicle display device unilaterally, it may cause inconvenience to the vehicle driver. Hence, described in the following is an adaptive display control method implemented in a manner that the controller enables the vehicle display device to be customized for the vehicle driver (passenger included). This method is identically or similarly applicable to a display control method according to a sitting height of a vehicle passenger and the like.

Referring to FIG. 34(a), when a controller provides the aforementioned vehicle operation data to a display device, a controller may provide the corresponding vehicle operation data to a contact point 3412/3414 between a vehicle driver's gaze point and a display area on the vehicle display device.

For instance, in FIG. 34(a), if the vehicle watches a front view straight, the controller controls vehicle operation data to be displayed on the corresponding area 3412. On the other hand, if the vehicle driver watches a front view straight and also watches a bottom part by lowering the vehicle driver's head, the controller controls the vehicle operation data to be displayed on the corresponding area 3414. In doing so, if a prescribed data display area is currently provided, the controller may control the display area to be shifted to the area 3414.

Meanwhile, the vehicle driver may not watch the front view straight. For instance, referring to FIG. 34(b), the vehicle driver watches the front side of the vehicle straight and then turns a head to the right slightly. Hence, a vehicle driver's sight fails to match the front side of the vehicle. If the controller continues to provide information 3422 to the front side of the vehicle, the vehicle driver is unable to recognize or obtain it correctly. Moreover, if the information 3422 is important to the vehicle operation or the vehicle driver, it may cause serious problems. Hence, although the vehicle driver does not stare at the front view straight, the controller may control data to be displayed on the display area 3424 related to the driver's sight.

FIG. 34 may apply to each data, or may not. For instance, the controller may control the display device not for all data but for information determined or classified as important to vehicle operation or vehicle driver/passenger in the manner shown in FIG. 34.

Meanwhile, regarding the vehicle driver's sight or focus change shown in FIG. 34, after data obtained from one of a camera sensor, an image sensor, an eye-tracking sensor and the like, which are provided within the vehicle, has been processed and recognized, it is enough for the controller to generate a control command according to the recognized data.

FIG. 35 is a diagram to describe a method of data communication with other devices 3514 and 3524 in the course of vehicle operation according to one embodiment of the present invention.

Owing to the rapid development of a mobile terminal 3514/3524, a vehicle passenger popularly uses the mobile terminal 3514/3524 for the purposes of navigation, music listening through Bluetooth link and the like while driving a vehicle. Yet, such a use of the mobile terminal 3514/3524 may cause an accident particularly in case of operating the vehicle in manual mode.

Referring to FIG. 35, a controller may control a display of related data as well as data communication between the vehicle and a mobile terminal in/out of the vehicle.

Particularly, if the vehicle is in auto driving mode, although data is provided to a display device 3512/3522 in the vehicle, the vehicle passenger may gaze at the mobile terminal 3514/3524 without watching or paying attention to the data. Hence, for a case that the vehicle passenger uses or gazes at the mobile terminal 3514/3524 or a case of a presence of important data the vehicle passenger should be informed of, the controller may control data to be provided through the mobile terminal 3514/3524 of the vehicle passenger. On the other hand, the controller may control data, which is received through the mobile terminal 3514/3524, not to be displayed through the display device 3512/3522 for privacy protection unless there is a single vehicle passenger. Yet, in case of a presence of a single vehicle passenger or a vehicle passenger's request, the controller appropriately copes with such a case by determining a display area in the display device 3512/3522, a display window size, a presence or non-presence of conversion into voice and the like according to the currently provided vehicle operation data.

FIG. 35(*a*) shows a case that a vehicle passenger wears a wearable device such as a smart watch. FIG. 35(*b*) shows a case that a vehicle passenger uses a smartphone.

Figure 36:
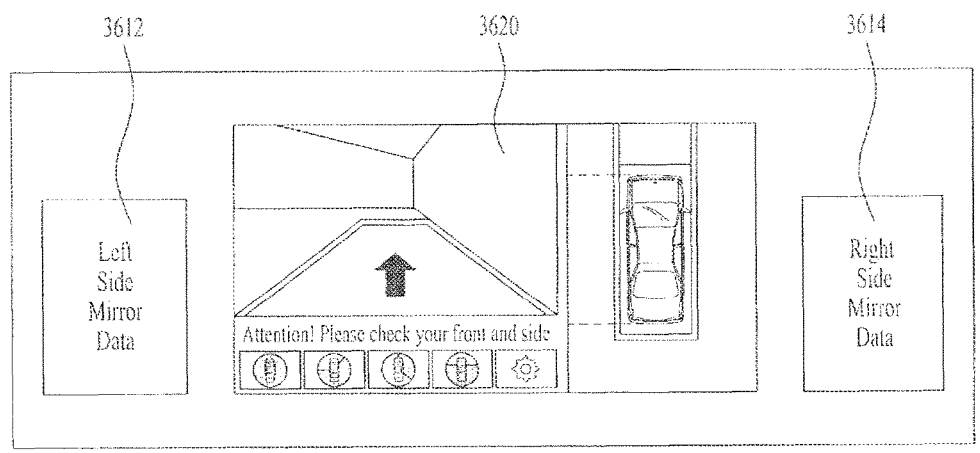
FIG. 36 is a diagram to describe a method of controlling a display device in case of backing or parking a vehicle according to the present invention.

FIG. 36 is a diagram to describe a method of controlling a display device in case of backing or parking a vehicle according to the present invention.

FIG. 36 relates to a method for a controller to control a display in case of backing or parking backward a vehicle.

If a vehicle driver shifts into reverse gear, a controller controls data obtained from a rear sensor and the like to be provided through a display device.

Recently, as a rear camera is installed at a tail of a vehicle, although a vehicle driver gazes at a front view without turning back the vehicle driver's gaze, an image obtained through the rear camera is provided through a navigation and the like. Yet, in this case, the vehicle driver may need side mirror data as well as rear view data. Moreover, since a rear camera may have a blind spot, the vehicle driver's gaze is not stationary usually despite the image obtained through the rear camera until the backing or the backward parking is completed. Thus, if the vehicle driver's gaze is changed, the information becomes meaningless.

Therefore, according to the present invention, if the controller detects a change of the vehicle driver's gaze in addition to the above description, the controller may provide image data 3620 obtained through the rear camera and the like to a display area near the detected changed gaze. Herein, the display area may mean not only a display area on a display device implemented on a vehicle's front glass but also a display area on a display device implemented on a vehicle's left or rear glass. Moreover, the controller detects an object, voice and the like for a region in a prescribed range of vehicle ambience and then provides the detected ones to the vehicle driver together with the image.

Moreover, referring to FIG. 36, an image of a full vehicle image vs. an ambient environment may be provided as well as a rear view image. In FIG. 36, when the vehicle's rear view image 3620 is provided, vehicle's left and right view images, i.e., side mirror data 3612 and 3614 are provided together, the display device may be controlled to minimize the change of the vehicle driver's gaze.

Figure 37:
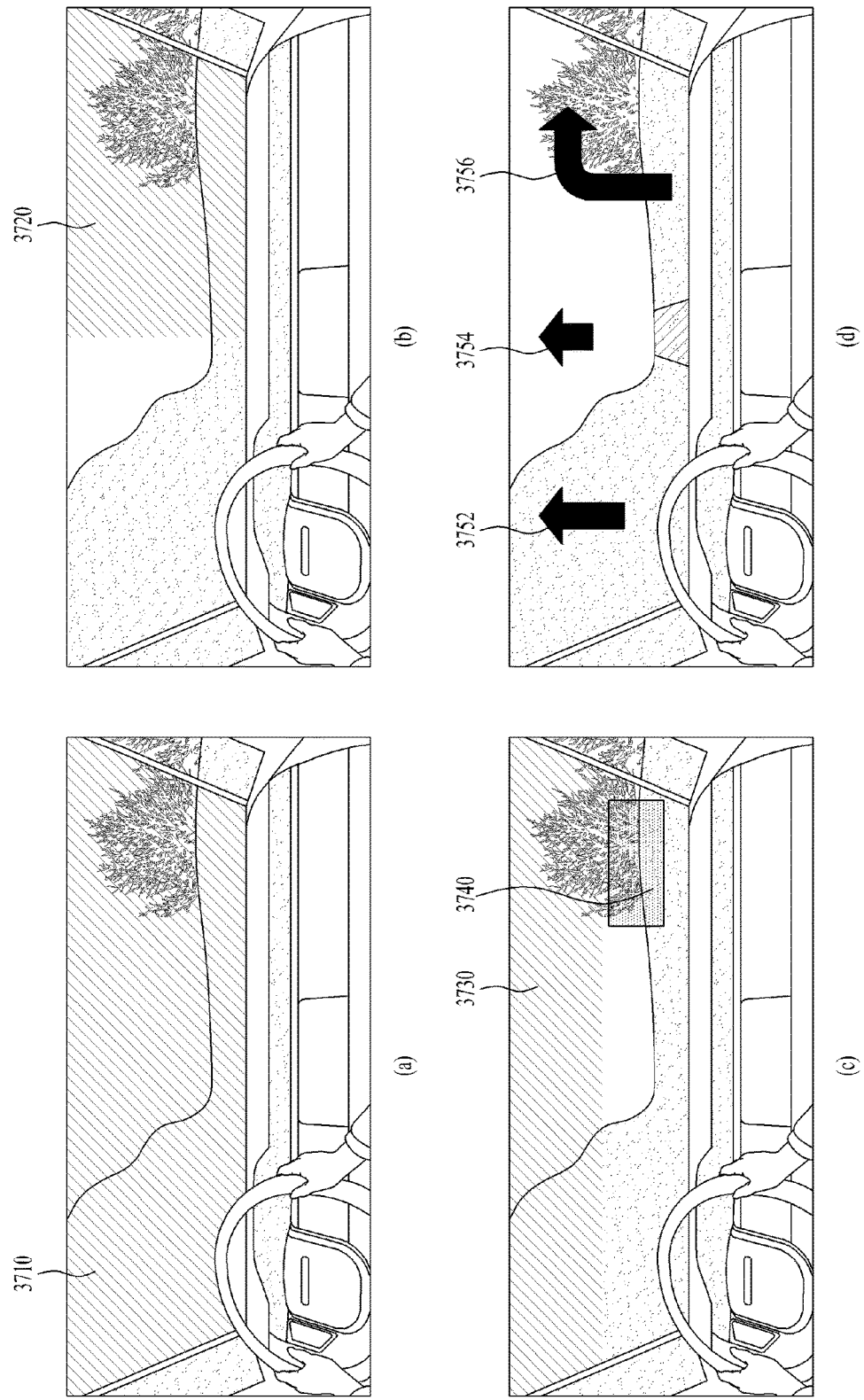
FIG. 37 is a diagram to describe a method of controlling a display device to cope with an ambient environment according to another embodiment of the present invention.

FIG. 37 is a diagram to describe a method of controlling a display device to cope with an ambient environment according to another embodiment of the present invention.

FIG. 37 relates to the substance for a controller to adaptively control a display device when an ambient environment is changed in the course of vehicle operation.

FIG. 37(*a*) shows one example of a case that a front sight 3710 suddenly becomes dark in the course of vehicle operation. The controller controls such a case in a manner similar to that shown in FIG. 31(*b*).

FIG. 37(*b*) and FIG. 37(*c*) show examples of a case that a sight 3720 is limited to a portion of the display device of the vehicle only. In this case, the controller may control vehicle operation data to be provided to a display area failing to overlap with the case that the sight is limited in the display device.

Similarly to the former description, referring to FIG. 37(*b*) or FIG. 37(*c*), as light is applied tin front of the vehicle, when vehicle operation is interrupted, if such interruption occurs in a partial area only, transparency, resolution, brightness, contrast and the like of a display area 3730 among display areas of the display device are adjusted. Accordingly, vehicle operation data can be controlled to be also displayed on the rest of the display region 3740 only.

FIG. 37(*d*) is a diagram to describe a display control method in case of providing navigation informations 3752, 3754 and 3756 through a display device implemented on a vehicle's front glass.

Generally, navigation information is provided through an individual device or mobile terminal having a screen in a determined size and corresponds to a reduction of a real ambience. Hence, when a vehicle driver drives on a complicated road, the vehicle driver may enter a wrong road due to confusion caused by a reduced screen of a navigation. Thus, the vehicle driver has such inconvenience.

According to the present invention, for vehicle driver's operation convenience, as shown in FIG. 37(*d*), navigation information is provided on a display device in the same size of a real sight watched by the vehicle driver, thereby minimizing the road entry confusion of the vehicle driver.

Meanwhile, in providing navigation information, as shown in FIG. 37(*d*), the controller may provide an intuitive UI as a length, size, color and the like of a related indicator are changed according to a remaining distance to a location indicated by a corresponding indicator.

Meanwhile, with respect to the present invention, a mirrorless vehicle means a vehicle without side mirrors, by which the mirrorless vehicle is non-limited. It is necessary for the mirrorless vehicle to collect the side mirror data and output it through a display device. Hence, a mirrorless vehicle may be used as a meaning that includes a vehicle provided with components required for installing a camera module or a fisheye lens for the side mirror data collection as well as a vehicle having no side mirror. The mirrorless vehicle may be related to a room mirror provided within the vehicle as well as a side mirror. So to speak, a mirrorless vehicle may have a meaning that includes a room mirror removed vehicle. In a mirrorless vehicle having a room mirror not exist within a vehicle, the room mirror data may be provided on a display device by referring to a side mirror data display scheme. If the room mirror data is provided together with the side mirror data, a display area, a display size and the like of the display device can be adjusted appropriately.

Therefore, according to the various embodiments of the present invention, an in-vehicle intelligent display cab be configured and controlled, a display providing a vehicle use convenience of a vehicle passenger based on a factor (e.g., a vehicle operation mode, a vehicle operation area, a vehicle speed, a vehicle passenger, a vehicle operation time, etc.) and a prescribed combination of various factors can be provided, vehicle use convenience of all vehicle passengers can be enhanced through the display, and various events possible to occur in the course of vehicle operation can be handled appropriately.

A vehicle and method of controlling a display therein disclosed in the present specification can be achieved by combination of structural elements and features of the present invention. Each of the structural elements or features should be considered selectively unless specified separately. Also, some structural elements and/or features may be combined with one another to enable various modifications of the embodiments of the present invention.

A method of controlling a display in a vehicle disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An automated vehicle supporting autonomous or self-driving, the vehicle comprising:
   sensors;
   a display including a display area formed on a glass of the vehicle; and
   a controller configured to:
      cause the display to display data obtained via at least one of the sensors on the display area based on an operation mode of the vehicle and vehicle passenger information; and
      cause the display to not display the data obtained via the at least one of the sensors when the operation mode is an automatous or self-driving mode in which a driver is not required.

2. The vehicle of claim 1, further comprising a lens located at a portion of the vehicle and configured to obtain side view data.

3. The vehicle of claim 2, wherein the lens comprises a fisheye lens having a global shutter sensor, and wherein a viewing angle of the fisheye lens is 180°.

4. The vehicle of claim 2, wherein the controller is further configured to:
   process image data obtained through the lens; and
   cause the display to display the processed image at a prescribed display area of the display area.

5. The vehicle of claim 2, wherein the controller is further configured to cause the display to display the data obtained via the at least one of the sensors and the data obtained via the lens at a specific display area of the display area when the operation mode is a manual mode in which a driver is required.

6. The vehicle of claim 1, wherein the controller is further configured to control at least one of transparency, resolution, or brightness of the display area based on ambient environment data of the vehicle obtained from the data collected via the at least one of the sensors such that the at least one of transparency, resolution, or brightness of the display area is changed when the ambient environmental data is changed.

7. The vehicle of claim 1, wherein the controller is further configured to:
   collect gaze information of a driver of the vehicle via the at least one of the sensors; and
   cause the display to display vehicle operation data obtained via the at least one of the sensors at a portion of the display area determined based on the collected gaze information.

8. The vehicle of claim 1, wherein when the operation mode is a manual mode, the controller is further configured to cause the display to display vehicle operation data obtained via the at least one of the sensors at a specific portion of the display area determined based on at least one of:
   a speed of the vehicle;
   a current location of the vehicle;
   current time; or
   a distance from the vehicle to a destination.

9. The vehicle of claim 2, wherein the vehicle lacks a side mirror.

10. The vehicle of claim 1, wherein the glass is a front glass.

11. The vehicle of claim 1, wherein the glass comprises a windshield or front window.

12. An automated vehicle supporting autonomous or self-driving, the vehicle comprising:
   sensors;
   a display including a display area formed on a glass of the vehicle; and
   a controller configured to:
      cause the display to display data obtained via at least one of the sensors on the display area based on an operation mode of the vehicle and vehicle passenger information;
      determine a number of passengers inside the vehicle based on the vehicle passenger information; and
      cause the display to display vehicle operation data obtained via the at least one of the sensors on a screen of a mobile terminal registered to the vehicle and associated with a vehicle passenger when the operation mode is an automatous or self-driving mode and when the determined number of passengers is plural.

* * * * *